(12) United States Patent
Shafer et al.

(10) Patent No.: US 11,588,226 B1
(45) Date of Patent: Feb. 21, 2023

(54) SYSTEMS AND METHODS FOR RADIO TAG DETECTION

(71) Applicant: Arizona Board of Regents acting for and on behalf of Northern Arizona University, Flagstaff, AZ (US)

(72) Inventors: Michael W. Shafer, Flagstaff, AZ (US); Paul G. Flikkema, Flagstaff, AZ (US)

(73) Assignee: Arizona Board of Regents Acting for and on behalf of Northern Arizona University, Flagstaff, AZ (US)

( * ) Notice: Subject to any disclaimer, the term of this patent is extended or adjusted under 35 U.S.C. 154(b) by 0 days.

(21) Appl. No.: 17/448,511

(22) Filed: Sep. 22, 2021

Related U.S. Application Data

(60) Provisional application No. 63/081,789, filed on Sep. 22, 2020.

(51) Int. Cl.
| | |
|---|---|
| *H01Q 1/28* | (2006.01) |
| *G01S 1/04* | (2006.01) |
| *H01Q 1/27* | (2006.01) |
| *A01K 11/00* | (2006.01) |

(52) U.S. Cl.
CPC .............. *H01Q 1/28* (2013.01); *G01S 1/045* (2013.01); *A01K 11/008* (2013.01); *H01Q 1/273* (2013.01)

(58) Field of Classification Search
CPC .......... H01Q 1/28; H01Q 1/273; G01S 1/045; A01K 11/008
See application file for complete search history.

(56) References Cited

U.S. PATENT DOCUMENTS

| | | | |
|---|---|---|---|
| 9,979,463 | B1 | 5/2018 | Shafer et al. |
| 10,277,305 | B1 | 4/2019 | Shafer et al. |
| 2013/0070677 | A1* | 3/2013 | Chang .................. H04B 7/2041 370/328 |
| 2019/0154840 | A1* | 5/2019 | Ferguson ............... H04W 24/08 |
| 2020/0005656 | A1* | 1/2020 | Saunamaeki ........ G08G 5/0043 |
| 2020/0159209 | A1* | 5/2020 | Montoya-Mejia .... H04W 4/026 |

(Continued)

FOREIGN PATENT DOCUMENTS

| | | | |
|---|---|---|---|
| GB | 2593533 | * | 3/2020 |

OTHER PUBLICATIONS

Shafer, M.W. et al., Beyond Your Ears: VHF Tag Detection via Coherent Pulse Integration, The Wildlife Society Virtual Conference, Sep. 28-Oct. 2, 2020, 29 pages.

(Continued)

*Primary Examiner* — Awat M Salih
(74) *Attorney, Agent, or Firm* — IPTechLaw

(57) ABSTRACT

Implementations of a method of detecting a plurality of radio pulses may include, using a signal processor, combining at least three pulses included in radio data collected over a first time interval by a directional antenna coupled with a software defined radio coupled with a unmanned aerial vehicle (UAV), the UAV coupled with a base station including the signal processor; determining a detected time for each of the at least three pulses in the first time interval; using the detected time for each of the at least three pulses, predicting a future time for each of at least three future pulses; and, using the software defined radio and directional antenna, listening for each of the at least three future pulses in radio data over a second time interval.

20 Claims, 24 Drawing Sheets

(56) References Cited

U.S. PATENT DOCUMENTS

2021/0382128 A1\* 12/2021 Lan ........................ G01S 3/043
2022/0069449 A1\* 3/2022 Xue ..................... H01Q 21/205

OTHER PUBLICATIONS

Hafer, M.W. et al., UAV Wildlife Radiotelemetry: System and Methods of Localization, Methods in Ecology and Evolution, vol. 10, Jun. 29, 2019, pp. 10783-1795.

\* cited by examiner

SYSTEMS AND METHODS FOR RADIO TAG DETECTION

CROSS REFERENCE TO RELATED APPLICATIONS

This document claims the benefit of the filing date of U.S. Provisional Patent Application 63/081,789, entitled "System and Method for VHF Tag Detection Via Coherent Pulse Integration" to Shafer et al. which was filed on Sep. 22, 2020, the disclosure of which is hereby incorporated entirely herein by reference.

GOVERNMENT LICENSE RIGHTS

This invention was made with government support under National Science Foundation Award 1556417. The government may have certain rights in the invention.

BACKGROUND

1. Technical Field

Aspects of this document relate generally to systems for radio frequency detection. More specific implementations involve radio frequency detection for wildlife monitoring and research.

2. Background

Wildlife tracking has been done using tags or transmitters fastened to the wildlife to allow for monitoring and detection of the location of the wildlife. During monitoring and detection, a person enters an area on foot carrying a directional antenna connected to a radio that outputs an audible signal that corresponds to radio pulses emitted by a wildlife tracking tag received by the antenna. The person then listens to the varying volume of the audible pulses while moving the directional antenna to judge which antenna direction indicates the loudest pulses in order to identify a bearing to the animal to which the wildlife tracking tag is attached.

SUMMARY

Implementations of a system for detecting a plurality of radio pulses may include a directional antenna coupled with a software defined radio, the directional antenna and the software defined radio coupled to an unmanned aerial vehicle (UAV); a base station including a signal processor. The signal processor may be configured to receive radio data over a first time interval from the software defined radio received by the directional antenna and combine at least three pulses included in the radio data; determine a detected time for each of the at least three pulses in the first time interval, and, using the detected time for each of the at least three pulses, predict a future time for each of at least three future pulses. The system may, using the software defined radio and directional antenna, listen for each of the at least three future pulses in radio data over a second time interval.

Implementations of a system for detecting a plurality of radio pulses may include one, all, or any of the following:

The system may include where combining the at least three pulses further may include: filtering the radio data using a Chebyshev type II filter; windowing the radio data to form at least three pulse windows; performing a short-time Fourier transform of the radio data corresponding with each of the at least three pulse windows; summing magnitudes of Fourier coefficients of the short-time Fourier transforms of the radio data corresponding with each of the at least three pulse windows to form a plurality of short-time Fourier transform matrices; finding a maximum element for each of the short-time Fourier transform matrices; and applying a cumulative distribution function with a predetermined false alarm probability to each maximum element to confirm the detected time of each of the at least three pulses.

The cumulative distribution function may use an Erlang distribution.

The directional antenna may be a VHF antenna.

The radio data may be generated by a wildlife tracking tag.

The signal processor of the base station may be further configured to identify a bearing of the wildlife tracking tag using a principal component analysis and the at least three pulses.

The signal processor of the base station may be further configured to use a plurality of bearings calculated from a plurality of waypoints reached by the UAV and a center of mass analysis to identify a physical location of the wildlife tracking tag Implementations of a method of detecting a plurality of radio pulses may include, using a signal processor, combining at least three pulses included in radio data collected over a first time interval by a directional antenna coupled with a software defined radio coupled with a unmanned aerial vehicle (UAV), the UAV coupled with a base station including the signal processor; determining a detected time for each of the at least three pulses in the first time interval; using the detected time for each of the at least three pulses, predicting a future time for each of at least three future pulses; and, using the software defined radio and directional antenna, listening for each of the at least three future pulses in radio data over a second time interval.

Implementations of a method of detecting a plurality of radio pulses may include one, all, or any of the following:

The method may include where combining the at least three pulses further may include: filtering the radio data using a Chebyshev type II filter; windowing the radio data to form at least three pulse windows; performing a short-time Fourier transform of the radio data corresponding with each of the at least three pulse windows; summing magnitudes of Fourier coefficients of the short-time Fourier transforms of the radio data corresponding with each of the at least three pulse windows to form a plurality of short-time Fourier transform matrices; finding a maximum element for each of the short-time Fourier transform matrices; and applying a cumulative distribution function with a predetermined false alarm probability to each maximum element to confirm the detected time of each of the at least three pulses.

The cumulative distribution function may use an Erlang distribution.

The directional antenna may be a VHF antenna.

The radio data may be generated by a wildlife tracking tag.

The method may include, using the signal processor of the base station, identifying a bearing of the wildlife tracking tag using a principal component analysis and the at least three pulses.

The method may include, using the signal processor and a plurality of bearings calculated from a plurality of waypoints reached by the UAV and a center of mass analysis, identifying a physical location of the wildlife tracking tag.

Implementations of a method of detecting a location of a radio tag may include launching an unmanned aerial vehicle (UAV); reaching two or more waypoints with the UAV and performing one or more yaw rotations over a time interval at each of the two or more waypoints and, using a signal processor, combining at least three pulses included in radio data collected over each time interval at each of the two or more waypoints from a radio tag by a directional antenna coupled with a software defined radio coupled with the UAV, the UAV coupled with a base station including the signal processor. The method may include, using the signal processor, determining a detected time for each of the at least three pulses in each time interval for each of the two or more waypoints; using the signal processor, identifying two or more bearings of the radio tag using a principal component analysis and the detected times; and using the signal processor, the two or more bearings, and a center of mass analysis, identifying a physical location of the radio tag.

Implementations of a method of detecting the location of a radio tag may include one, all, or any of the following:

The radio tag may be a first radio tag and may include a second radio tag with a different pulse repetition interval from a pulse repetition interval of the first radio tag.

The method may include repeating combining the at least three pulses included in the radio data collected over each time interval, determining a detected time, identifying two or more bearings, and identifying a physical location for the second radio tag.

The two or more waypoints may be arranged in linear passes across a testing area.

The method may include where combining the at least three pulses included in the radio data collected over each time interval at each of the two or more waypoints from the radio tag further may include: windowing the radio data to form at least three pulse windows; performing a short-time Fourier transform of the radio data corresponding with each of the at least three pulse windows; summing magnitudes of Fourier coefficients of the short-time Fourier transforms of the radio data corresponding with each of the at least three pulse windows to form a plurality of short-time Fourier transform matrices; finding a maximum element for each of the short-time Fourier transform matrices; and applying a cumulative distribution function with a predetermined false alarm probability to each maximum element to confirm the detected time of each of the at least three pulses.

The radio tag may be a wildlife tracking tag.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended radio tag detection systems and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such radio tag detection systems and related method, and implementing components and methods, consistent with the intended operation and methods.

A discussion of various implementations of radio tag types and wildlife tracking techniques including the use of very high frequency (VHF) tags can be found in U.S. Pat. No. 9,979,463 to Shafer et al., entitled "UAV wildlife monitoring system and related methods," Ser. No. 15/489,602, filed Apr. 17, 2017 and issued May 22, 2018, the disclosure of which is hereby incorporated entirely herein by reference.

Figure 1:
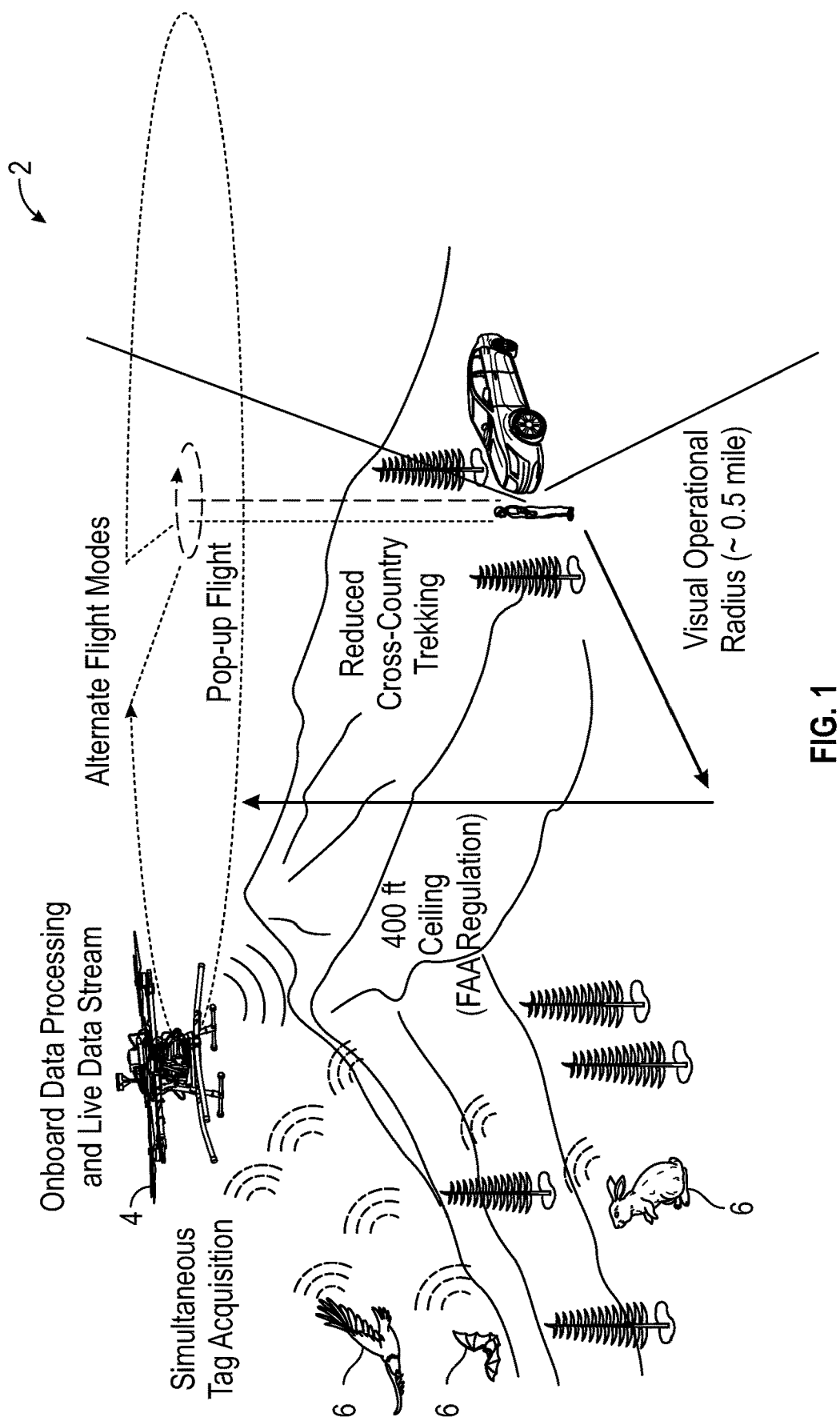
FIG. 1 is a diagram of a wildlife tracking operational environment.

Referring to FIG. 1, a diagram of an implementation of a wildlife tracking operational environment 2 is illustrated. As illustrated the user may utilize an unmanned aerial vehicle 4 with an onboard software defined radio to attempt to locate one or more tags associated with one or more animals 6 that may be able to fly or may be located on the ground. The use of the UAV may allow the user to substantially reduce the amount of travel on the ground by the human operator as the UAV eliminates the need to use audio signal tracking and a directional antenna to attempt to locate tags from each animal. In various implementations disclosed herein, the use of a UAV based radio tag locating system may allow for both accurate detection of individual tags and multiple tags associated with different animals essentially at the same time.

Figure 2:
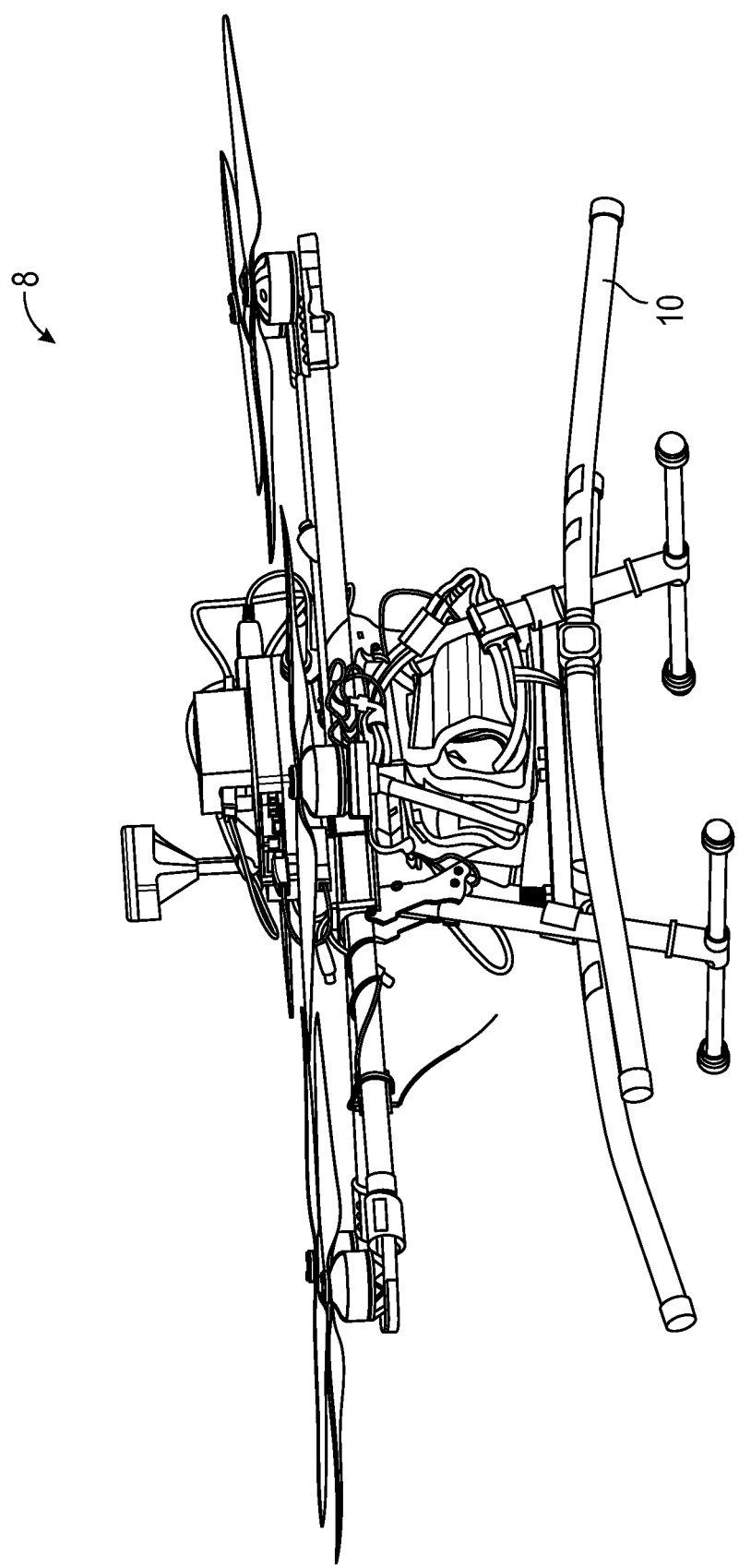
FIG. 2 is a perspective view of an implementation of an unmanned aerial vehicle (UAV)
Figure 20:
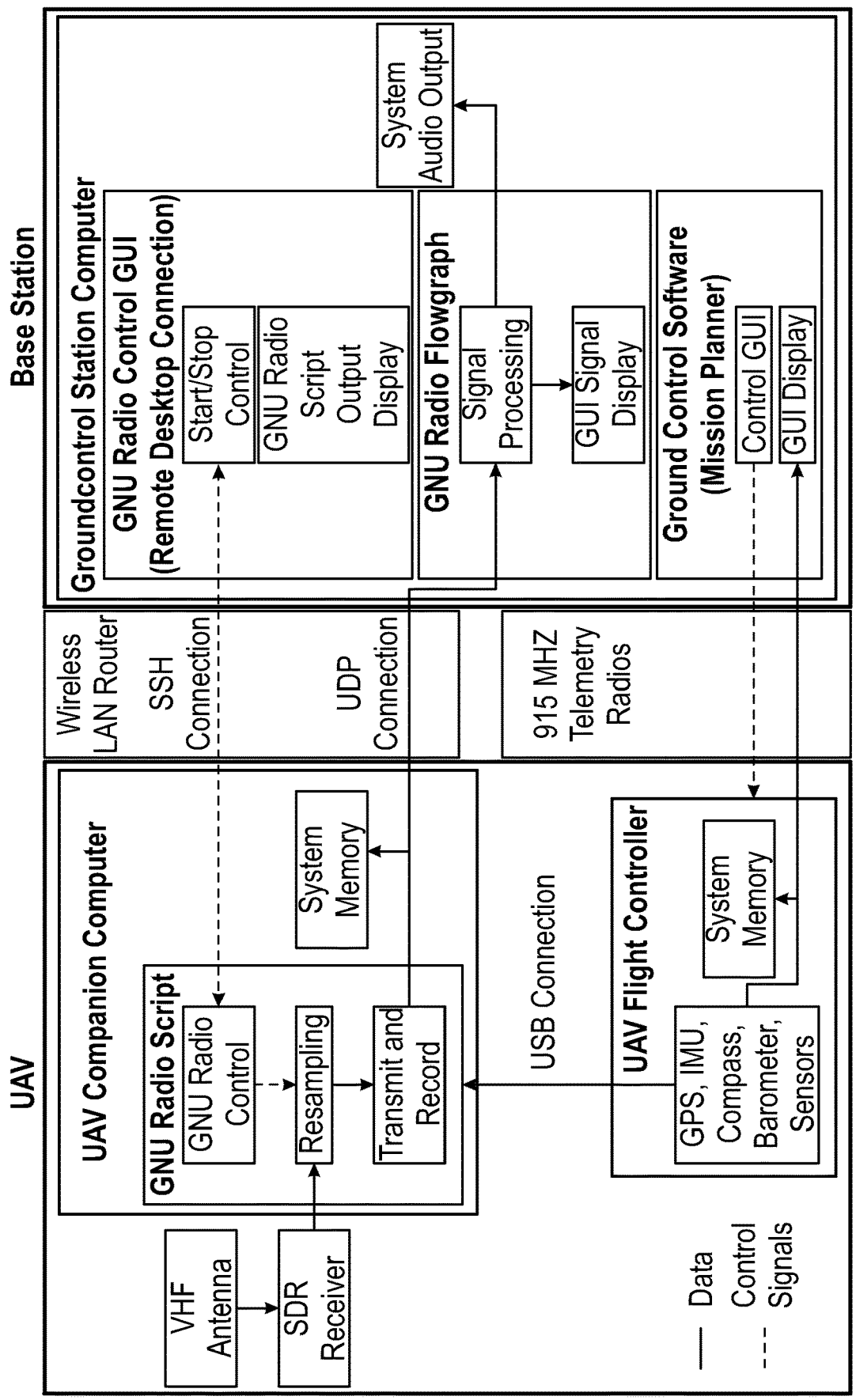
FIG. 20 is a block diagram of an implementation of a UAV flight control system and of an implementation of a base station.

Referring FIG. 2, the implementation of a UAV 8 that may be utilized in various system and method implementations disclosed herein is illustrated. The UAV-RT system illustrated consists of a UAV, payload. and Ground Control Station (GCS). The hex-rotor vehicle uses a Pixhawk flight controller for autonomous execution of flight plans. The radiotelemetry payload includes a VHF antenna, software defined radio (SDR), and single-board computer that communicates with the GCS via a WiFi telecommunication channel. Communication between the Pixhawk and companion computer enables synchronized radio and vehicle data records. The GCS (which is implemented on a laptop computer) allows for flight planning and monitoring, and can be configured to monitor VHF data during flight. During system operation, bearing estimation uses received signal strength (RSS) and antenna attitude when tag pulses from a radio tag are detected. The UAV flight controller provides the attitude log, along with the global positioning system (GPS)-measured location for localization. The radio record provided by the SDR is fused with vehicle telemetry as shown in the avionics and software block diagram illustrated in FIG. 20. As illustrated in FIG. 20, vehicle telemetry is accessed by a GNU Radio flowgraph using a custom Python script and recorded on the companion computer/base station signal processor as a time-stamped log file. The GNU Radio program "flowgraphs" are developed through a block diagram GUI programming language (GNU Radio Companion) or Python in various implementations.

Referring to FIG. 2, the UAV implementation uses a carbon hexacopter frame. A 3D printed payload enclosure includes mounts for the system's GPS and VHF antenna. The implementation illustrated in FIG. 2 weighs 4.73-kg system mass and a 20-Ah battery, providing 20 to 25 minutes of flight time. Referring to FIG. 20, the Pixhawk Mini flight controller runs Arducopter firmware which allows for predefined flight plans in autonomous operation mode. The flight controller communicates with GCS via a 915-MHz vehicle telemetry radio telecommunication channel for in-flight waypoint updates and monitoring of the vehicle via the GCS. The open source Mission Planner may be utilized as the GCS software to operate the base station. Flight plans including waypoints can be programmed prior to launch using a combination of the Takeoff, Loiter Turns and Return to Launch commands, where the altitude, number of spins and latitude/longitude coordinates are programmed to move the vehicle between waypoints and spin in place to collect direction of arrival (DOA) data. Connectivity between the vehicle's companion computer and the GCS computer for the purpose of science payload control is maintained through either a router established wireless network or by configuring the companion computer/base station to establish its own wireless network.

Figure 21:
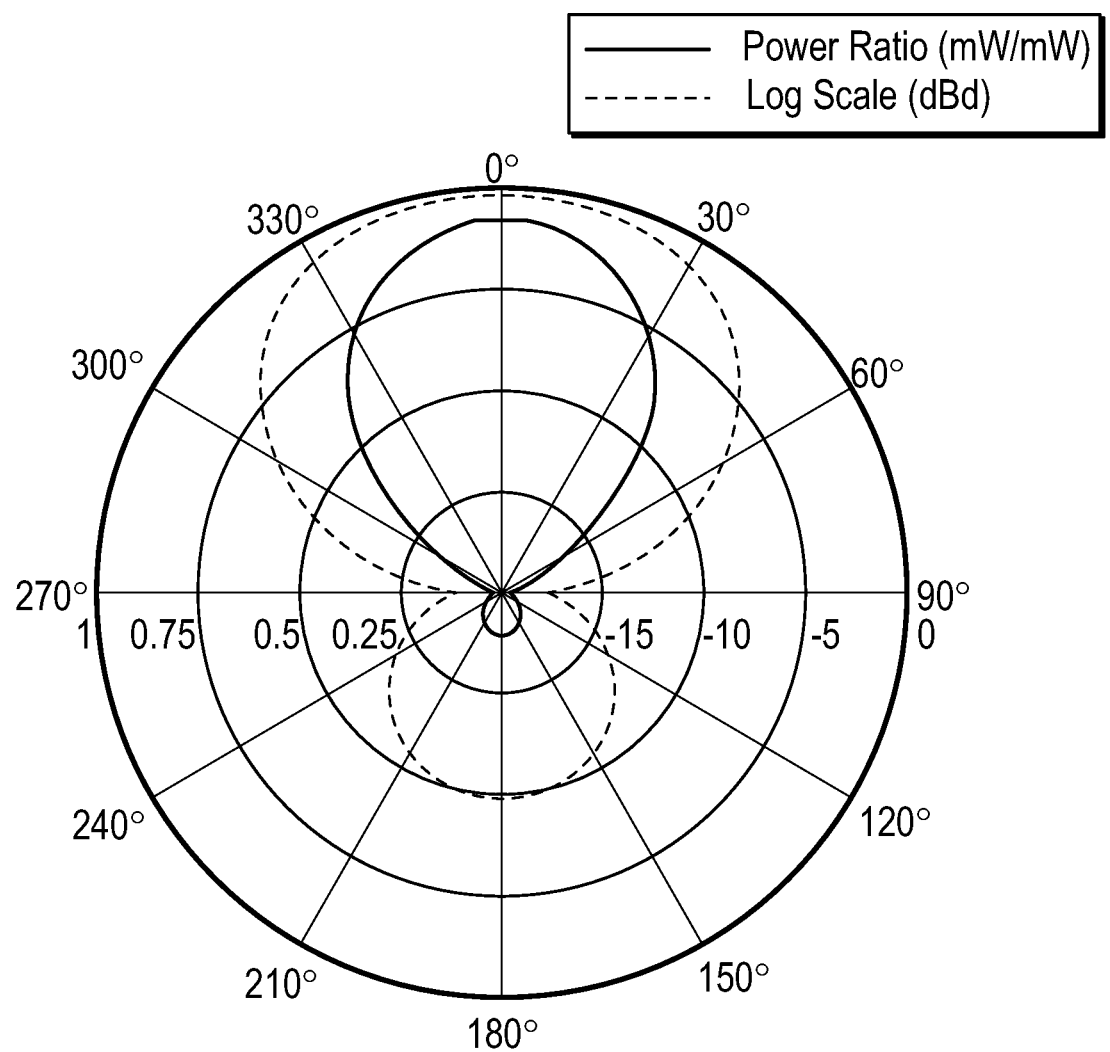
FIG. 21 is a diagram of the power ratio of a directional antenna implementation.

Referring to FIGS. 2 and 20, The UAV-RT payload consists of an H-antenna 10, an SDR front-end, a single-board computer and a WiFi modem. Directional and omni-directional antennas can be interchanged in various implementations. In particular implementations, an antenna marketed under the tradename TELONICS RA-23K by Telonics, Inc. of Mesa, Ariz. for directional search methods. The gain pattern of the RA-23K is illustrated in FIG. 21. In the implementation illustrated in FIG. 2, the Airspy R2 SDR (24-1,700 MHz bandwidth) utilized can provide both 2.5 and 10 million samples/second data rates. In various implementations, the lower data rate is sufficient at the low uncertainty typically present (about 1 KHz) of an exact tag carrier frequency (around 100 MHz).

Figure 22:
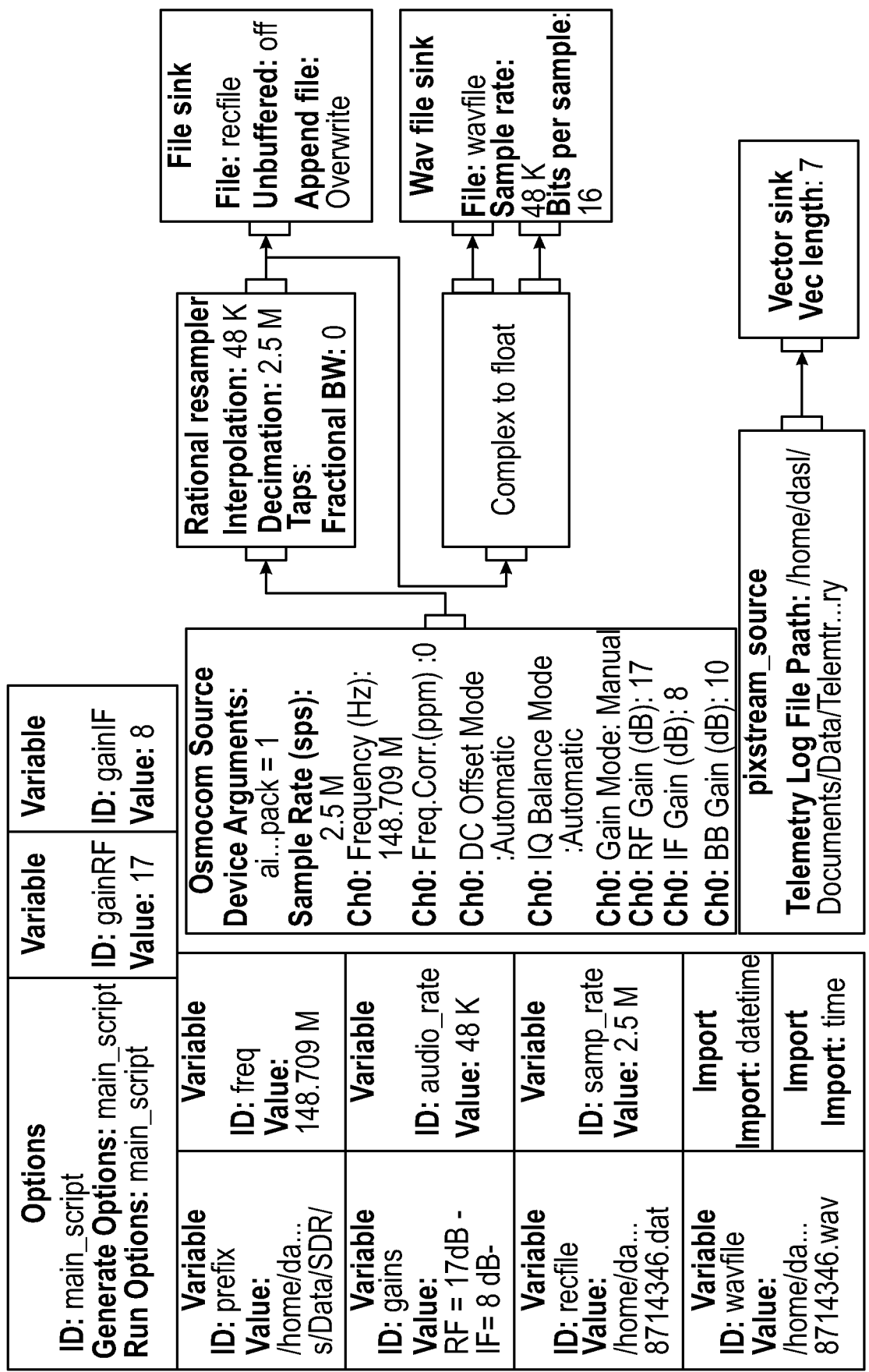
FIG. 22 is a flow diagram of a flowgraph used in a method implementation for processing radio data.

Referring to FIG. 22, a block diagram of a flowgraph implementation used for processing radio data received by the SDR is illustrated. GNU Radio software is utilized to control and process data from the SDR. GNU Radio supports network-based transmission of received radio data via a user datagram protocol connection. In various implementations, this feature enables users at the GCS to both hear and see radio spectra in real time, but is limited by the range of the WiFi connection. The flowgraph implementation illustrated in FIG. 22 deployed on the vehicle's companion computer/base station processor receives, processes, records, and if configured, transmits the received data over WiFi to the GCS. In various implementations, interruptions in the wireless network connection do not affect the integrity of the on-board data record. A custom Python script was written that communicates with the flight controller over a serial link. The script is written as a GNU Radio block and thus is included as part of the flowgraph running on the companion computer/base station processor.

Figure 23A:
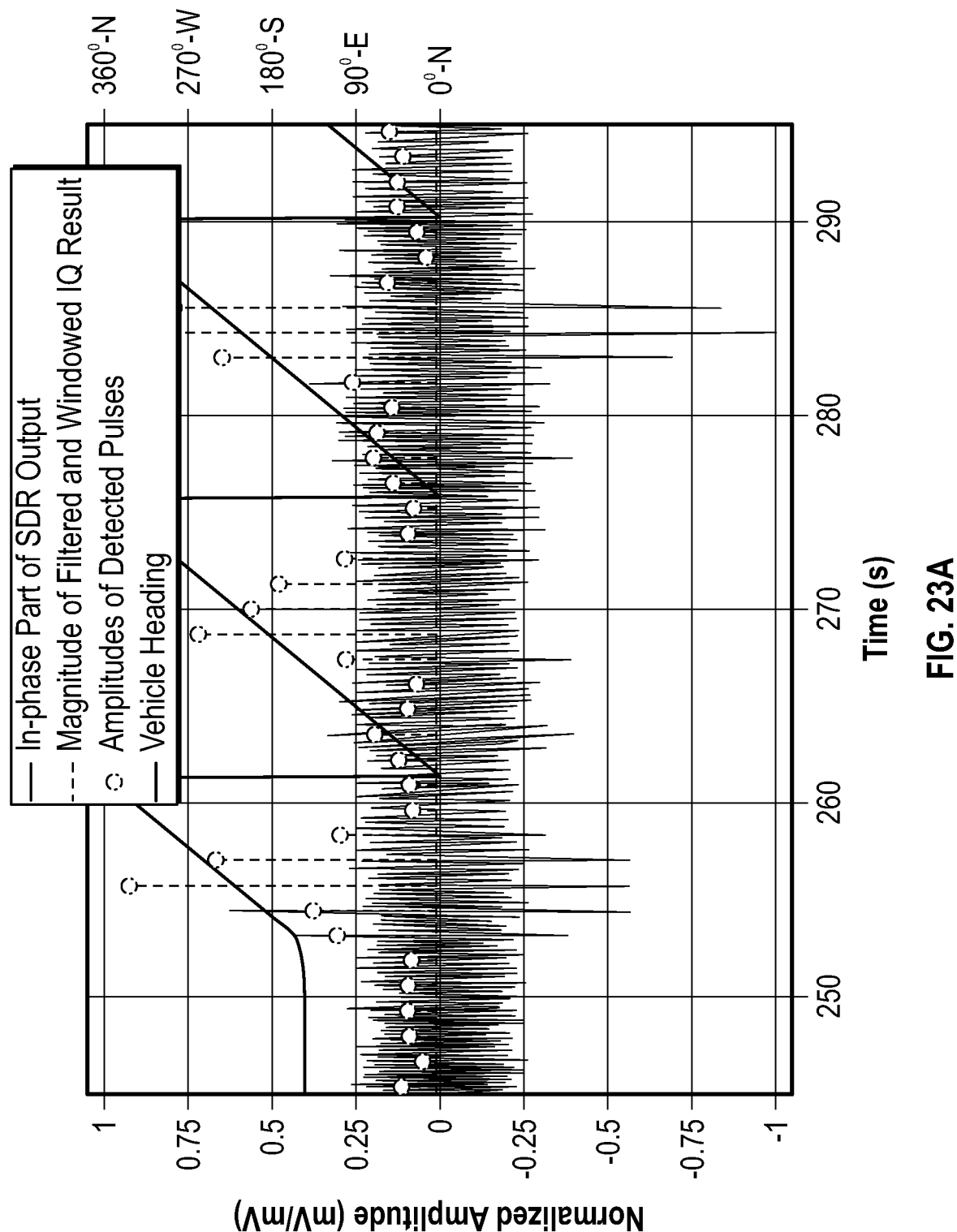
FIG. 23A is a time series plot of filtered radio data with showing data maximums.

In various implementations, radio signals are received by the SDR front end and downconverted to baseband. The magnitude of this resampled in-phase/quadrature (IQ) data (time series data in FIG. 23A) is then filtered in particular implementations using a third-order, 160-Hz bandwidth Chebyshev type II bandpass filter, centered at the baseband pulse frequency (20 dB stopband attenuation) of the radio tag being tracked. This frequency can be measured prior to tag deployment (a priori) or by observing the spectrum of the received data in various implementations. A Chebyshev type II filter has a flat passband so that a slight drift in the transmitter or receiver oscillator frequency does not alter the magnitude of the filtered pulses. In other implementations, however, a filter other than a Chebyshev filter may be employed.

This incoming data from the SDR front end is a complex-valued I/Q data stream. The radio data is then separated into segments of approximately 4 s. Methods for determining the exact time length of these segments (time windows) is discussed further on in this document. To remove noise and reduce the processing load, the radio data is then bandpass filtered around the approximate center frequency of the pulse train and filter/decimate to a sampling rate of Ts. The filter bandwidth is determined by the pulse bandwidth and the a priori uncertainty of the center frequency of the pulse train. A Cheveyshev filter may be employed at this stage. Since the SDR data is discrete-time, a single pulse of duration L samples indexed in time by nTs→n can be represented by $$p[n;\delta,\theta]=a_L[n-\delta]e^{\iota\varphi[n-\delta]}, \quad (1)$$

where $$a_L[n] = \begin{cases} a[n], & n \in \{1, 2, \ldots, L\} \\ 0, & \text{otherwise,} \end{cases} \quad (2)$$

and where $\delta$ is a delay and $\theta=\{a[n], \varphi[n]; n\in\{1, 2, \ldots, L\}\}$ captures the intra-pulse features—the magnitude sequence $a[\cdot]$ and phase trajectory $\varphi[\cdot]$.

Because fast frequency-domain algorithms are utilized, the incoming data is processed in segments of samples whose durations $n_S$ are specified to contain at least K pulses; a segment may contain K full pulses, K full pulses and a portion of an additional pulse, or K+1 full pulses. We model the pulse repetition intervals (PRIs) as follows: for tag i's pulses indexed as k=1, ..., K+1, the starting sample of pulse k follows the starting sample of pulse k−1 by $\Upsilon^{i^k}$ samples, the inter-pulse sample time, with $\Upsilon_1^i=0$. Using equations (1), (2), $\delta^i$ is defined as the delay from the start of the segment to the first pulse of tag i, and define $\theta_k^i$ as the intrapulse features of pulse k of tag i, so that pulse k of tag i is:

$$p\left[n; \delta^i + \sum_{j=1}^{k}\gamma_j^i, \Theta_k^i\right] \quad (3)$$

Let $[.]_{n_I}^{n_I+n_S-1}$ be the operator that selects elements $n_I, \ldots, n_I+n_S-1$ from a larger vector of length $n_S$ from the incoming I/Q stream. Then the pulse set in the cleaved vector for tag i in the segment can be expressed as the vector $$s(\delta^i, \gamma^i, \Theta^i) = \left[\sum_{k=1}^{K+1} p\left[n; \delta^i + \sum_{j=1}^{k}\Upsilon_j^i, \theta_k^i\right]\right]_{n_I}^{n_I+n_S-1} \quad (4)$$

The parameters of the pulse train are a priori uncertain. For example, the inter-pulse interval results from a timing circuit. In implementations of aa minimal-complexity tag transmitter, a capacitor is charged and discharged through a resistor by a transistor. Because of variations in component manufacturing, circuit assembly and resulting parasitic effects, temperature, and noise, the inter-pulse interval varies about short- and long-term means. These effects motivate modeling using random variables. Therefore $\Upsilon^i=\{\Upsilon_k^i\}_1^{K+1}$ is a vector of up to K+1 random variables that characterize the PRIs; similarly, the random vector $\Theta^i=\{\theta_k^i\}_1^{K+1}$ captures the intrapulse features.

From classical detection theory, the outcomes of equation (4) include the set of hypotheses in an M-ary detection problem in the case of a single tag; when appropriately discretized into a finite set, the outcomes also form correlation templates matched to all possible received pulse train signals.

The noisy received signal for all tags is the vector $$r=\Sigma_i s(\delta^i, \Upsilon^i, \Theta^i)+n \quad (5)$$

where n is zero-mean circularly-symmetric complex noise with covariance matrix $\Sigma=[nn^H]$ where ($n^H$ is the conjugate transpose of n and E[.] is the expectation).

With the filtered and processed radio data, the signal processor of the base station then proceeds with further signal processing to detect pulse trains (and the time location of the various pulses within them). Key to detection of tag pulse trains is two-stage coherent processing of the pulses: phase-coherent matched filtering or correlation of the individual pulses and coherent combining of multiple pulses, where these are performed jointly to gain the SNR advantage of multi-pulse combining. Let the kth pulse be represented as the $D_k$-element column vector $p_k$; its optimum correlation template $w_k=\Sigma^{-1}p_k$, where $\Sigma^{-1}$ is the $D_k \times D_k$ noise whitening filter. If the pulse locations are known (corresponding to a single member of the set of outcomes of equation 4), then the coherent multi-pulse correlation can be represented as an $n_s$-element correlation or equivalently as the sum of a set of single-pulse correlations, with the templates $\{w_k\}_1^{K+1}$ temporally aligned with their pulses. The correlation output is then $$\Sigma_k \alpha_k w_k^H p_k \quad (6)$$

where $\alpha_k$ performs a phase rotation for each pulse, aligning them to a common phase for coherent combining.

Unfortunately, the inter- and intra-pulse features are not known a priori, and each feature has a different type and degree of uncertainty. In various system and method implementations, the overall goal is to surmount this uncertainty to capture the maximum possible signal energy in a segment. To accomplish this, a parametric search of the time-frequency plane is performed for a set of pulses that yields the maximum signal contribution to the coherent multi-pulse correlation. This search is aided by features of the pulse train, namely that the pulses are quasi-sinusoidal and their center frequencies are highly correlated.

Because in various method implementations the search is done in both time and frequency, a short-term Fourier transform (STFT) which a set of temporarily overcalled fast Fourier transforms (FFTs) with a window size (FFT length) filter. Analysis in frequency is performed by the orthogonal decomposition of the FFT. In this portion of this document, a summary of the theory of coherent multi-pulse detection using the STFT is discussed. Further in this document a computationally-efficient implementation is discussed in detail, with special emphasis on how the uncertainty in the inter-pulse intervals greatly complicates multi-pulse combining, with a solution using expanding analysis blocks, a block-shifting (shift-sum) combining strategy, and overlapped segments.

Equation 4 captures all possible locations of the pulses in a time interval (segment) and this set is denotes as T. The pulses from a tag have an essentially common spectral content, and we denote the set of possible spectra as F. The time-frequency search space is $\Omega=T \times F$, and we seek the element $\omega \in \Omega$ that best captures the pulse set. To simplify the discussion in this section, the assumption is made that the pulse's temporal location in the data segment is known. The DFT's composing the STFT employ a set of unitary (complex orthogonal) templates that span the frequency uncertainty of the pulse. Thus even if the pulse has a non-linear phase trajectory, and is therefore not constant in frequency, we can decompose its energy into discrete frequency bins without loss. The FFT's that compose the STFT can be described efficiently using the matrix formulation of the DFT, where in the expression v=Fv, v is the DFT of the vector v using the Fourier matrix F. Because F is unitary, $F^{-1}=F^H$ and $v=F^H$ v.

With the above notation, the discrete Fourier transform of the pulse is p=Fp, and a correlation template w can be synthesized from its frequency-domain representation, the complex spectral weighting vector w, using $w=F^H w$. With this result, the correlation operation is $$w^H p = w^H F F^{-1} p = w^H F p \qquad (7)$$

Equation 7 illustrates that the correlation can be performed by taking the inner product of w and the DFT p=Fp of p.

For example, consideration the situation where the received signal vector p of radio data matches the frequency and phase of bin $f_c$ of the DFT. For simplicity, the assumption is made that the noise is white, so $\Sigma=I$, that p is unit-norm, and the DFT matrix F is normalized so that its rows are unit-norm. Let $1_l$ be the vector with element l equal to one with all other elements zero. Then, because p is matched to bin $f_c$, $Fp=1f_C$. From equation 7, $$w_{f_c}^H = w_{f_c}^H F p = w_{f_c}^H 1_{f_c} \qquad (8)$$

But $w_{f_c}^H = (Fw_{f_c})^H = (Fp)^H = 1_{f_c}^H$ so $w_{f_c}^H p = 1_{f_c}^H 1_{f_c} = 1$. Moreover, $w_f^H p = 0$ for all $f \neq f_c$, so the correlator—the FFT kernel at bin $f_c$—is uniquely matched to the pulse. In this simple case, pre-multiplying the FFT output by $w_m^H$ is unnecessary, but, in general the operation performs a weighted sum of the FFT outputs corresponding to the spectrum of the signal vector, accounting for 1) spectral leakage between FFT bins when there is not an exact frequency match, and 2) phase non-linearity.

Note that the uncertainty in frequency can be assessed using pre-deployment measurements, enabling us to use prior information encoded as a bound on the range of frequencies searched. However, the initial phase is unknown due to varying initial conditions in the tag's transmitter circuitry at the triggering of a pulse. To maximize the signal-to-noise ratio when we perform multi-pulse combining, the correlator outputs can be coherently combined, meaning that the correlator outputs are be aligned in phase in particular method implementations. In other implementations, however, incoherent combining may be employed during signal processing.

For each $\omega \Sigma \Omega$, the individual DFT-based single-pulse correlator outputs can be combined to form the coherent multi-pulse correlator output $z_\omega$ for the frequency and pulse times indexed by $\omega$. As noted earlier, there may be K or K+1 pulses in a segment; it can be assumed here that K for simplicity. Let $y_\omega$ be the vector of coherent single-pulse correlator outputs for $\omega$, i.e., K values selected from a row of the STFT for the segment.

Then $$y_\omega = (y_\omega[1], \ldots, y_\omega[K])^T \qquad (10)$$

where $y_\omega[k] = \gamma_\omega[k] e^{i \angle y_\omega[k]}$. The optimum multi-pulse correlation template is $v_\omega = y_\omega$, so that the output of the multi-pulse correlator in a particular implementation is $$z_\omega = v_\omega^H y_\omega = \sum_{k=1}^{K} (\gamma_\omega[k])^2 \qquad (11)$$

In other implementations, however, where interpulse phase variability is zero the output of the multi-pulse correlator may be represented as $$z_\omega = \|v_\omega^H y_\omega\|^2 = \left\|\sum_{k=1}^{K} y_\omega[k]\right\|^2$$

Where the magnitude squared of the vector sum of the $y_\omega$ terms is used. The combination of coherent single-pulse correlation and coherent multi-pulse correlation is designed for putative sets of pulses at specific frequencies and times. Because there are $|\Omega|$ values that are candidates to be the test statistic for the decision, a generalized likelihood ratio test (GLRT) is used to select the test statistic z according to $$z = \max_{\omega \in \Omega} z_\omega \qquad (12)$$

which is compared with a which is compared with a threshold to make the decision of whether or not a K-pulse train is present in the data. Intuitively, the GLRT can be interpreted as follows: z is the maximum of the collection of output energies from the multi-pulse correlations. Thus the time-frequency region specified by $\omega^* = \arg\max_{\omega \in \Omega} z_\omega$, having the greatest energy, is the region occupied by the signal (if present) with the greatest probability, and is hence the best choice for using in the signal/no-signal decision. In implementations where multiple tags are present for tracking, this use of the test statistic can be modified to look for frequency peaks with sufficient frequency spread (local maxima rather than total maxima). Since, as discussed later, the time-frequency search space is dependent on the a priori specified frequency spacing of the pulses from the tags at issue, the test statistics may not be compared across frequency bins. Once a set of candidate maxima has been determined, a peeling algorithm can be employed to further identify peaks and sidebands across the various frequency bins.

In various implementations, z is used to define a hypothesis test as follows: under hypothesis $H_1$, the tag is transmitting the pulse train. Under hypothesis $H_0$, the tag is not transmitting (for any number of reasons), or is so far out of range that the signal power is effectively zero. Equation 12 is used to model z as the outcome of the random variable Z. In discovery of the timing of the pulses in the pulse train, it is not yet known if the pulse train is present, and if so, what its energy is. Thus only considering a threshold that depends on the false alarm probability selected by the user makes sense at this point. In various implementations, the decision threshold scalar $\lambda$ is selected such that $$P_f = \int_\lambda^\infty f_{Z|H_0}(z|H_0) dz \qquad (13)$$

The only contribution to Z under $H_o$ is noise; because in this case the per-sample noise is zero-mean circularly-symmetric complex Gaussian, the variance of the noise at the output of the coherent single-pulse correlator is $\sigma^2 = w^H \Sigma w$. Note that if the noise is white and $w^H w = 1$, then this noise power is equal to the per-sample noise power $\alpha_n^2$. In general, if the noise is white, $\sigma^2 = \sigma_n^2 w^H w = \sigma_n^2 \|w\|^2$.

Under $H_o$, $y_\omega[k]$ (see equation (10)) is zero-mean circularly-symmetric complex Gaussian; from the inner product structure of single-pulse correlation, it is a weighted sum of zero-mean circularly-symmetric complex Gaussian random variables. Any particular $Z_\omega$ is correlated with many others which share with it overlapping data in time and frequency, so the joint distribution of the random variables $Z_\omega$, $\omega \in \Omega$, is very complex, and the distribution of Z—being the maximum of $|\Omega|$ sums of correlated exponential r.v.'s—is analytically intractable. However, simulation can be used to compute $\hat{f}_{Z|H0}(z|H_0)$, the empirical probability density function of Z under $H_0$.

The associated cumulative distribution function of Z under $H_0$ $\hat{F}_{Z|H_0}(z|H_0) = \int_{-\infty}^{z} \hat{f}_{Z|H_0}(x|H_0)dx$, is used along with $P_f$ to determine the decision threshold using the relationship $$P_f = 1 - \hat{F}_{Z|H_0}(\lambda|H_0) \tag{14}$$

so that any root-finding method can be used to compute the (single) zero $\lambda$ of the function $$g(z) = 1 - P_F - \hat{F}_{Z|H_0}(Z|H_0)$$

Since by equation 11 $\gamma_\omega[k]^2$ is the squared magnitude of $\gamma_\omega[k]$, under $H_0$ the output $z_\omega$ of the coherent multi-pulse correlator for any $\omega$ is Erlang distributed. Appendix A filed herewith, the disclosure of which is hereby incorporated entirely herein by reference, contains additional information regarding the use of the Erlang distribution and the test statistics.

The empirical probability distribution $\hat{f}_{Z|H_0}$ on which the threshold $\lambda$ is based depends on a number of input parameters, so full characterization of the entire parameters space could be computationally expensive. In order to reduce the number of simulation runs, experimental design methods can be deployed to non-dimensionalize dependent and independent variables in order to reduce the dimensionality of this experimental space. The test statistic z can be thought of as a dependent variable.

$$z = g(S_{xx}(\omega), F_s, t_p, t_{ip}, t_{ipu}, K, M_t) \tag{15}$$

Subsequently it will be shown that z also depends on the spectral weighting matrix (W) and the overlap fraction (OLF) of the short-time Fourier transform stage of processing. Both of these terms are nondimensional and are likely to be held constant, so they are excluded from discussion here. The noise power spectral density $S_{xx}$ could be constant across the bandwidth for a given receiver in the white noise case, but could vary across the bandwidths considered. Frequency dependent variations in $S_{xx}$ most often result from anti-alias filtering methods in the decimation stages in the radio processing, i.e. the rolloff of power at high frequency. The pulse parameters such as duration ($t_p$), inter-pulse time ($t_{ip}$), and the inter-pulse time uncertainty ($t_{ipu}$) all affect the distribution of the test statistic, as they drive the parameters of the first-stage matched filter and that of the second-stage incoherent combinations. The overlap fraction (OLF) of the STFT of the matched filter stage and the number of pulses (K) used for pulse combining affect the distributions as well. Finally, the time search method ($M_t$) is a binary selector which dictates if prior information regarding the pulse arrival time is used. Later in this document it will be demonstrated that if there is no prior prediction of a pulse arrival, a wide time block is used but with prior knowledge a much smaller window/time interval width is possible. The effect of this difference in time window size necessarily affects the resulting distribution of the test statistic.

Examining the parameters of equation 15 indicates that both power (W) and inverse time (Hz) can be taken as the base dimension. The test statistic z has units of power (W), as it is the square of the output of a DFT, a transformation that maintains the units of the its input data (V). With two dimension and seven parameters, the Buckingham $$\frac{Pi}{M}$$

theorem states that equation 15 can be expressed as $$\zeta \equiv \frac{z}{S_{xx(\omega)}F_s} = G(F_s t_p, F_s t_{ip}, F_s t_{ipu}, K, M_t) \tag{16}$$

In this relationship, the noise power spectral density $S_{xx}(\omega)$ and the sample rate $F_s$ are chosen as the parameters used for non-dimensionalization. A 6-dimensional space requires empirical mapping rather than the initial 8-dimensional space. Moreover, this formulation allows for generalization of the thresholds for radios with different noise figures or sample rates that differ than that used to generate the thresholds. Note that K and $M_t$ are already non-dimensional. This formulation could also be used to tailor thresholds for non-white or time-varying noise. The new non-dimensional input parameters on the right side of equation 16 represent the number of samples in the pulse, the inter-pulse samples, and the interpulse uncertainty in samples. Under the null hypothesis, the non-dimensional parameter $\zeta$ of equation 16 can be thought of as the ratio of the noise power at the output of the signal processing to input noise power over the entire segment containing the combined pulses. Under $H_1$, non-dimensionalizing the test static in the same way would give a measure of the signal+noise power at the output of the processing to the input noise power. Similar to the dimensional formulation of equation 17 below, non-dimensional thresholds ($\Lambda$) can be determined for this non-dimensional test statistic based on $$P_f = 1 - \hat{F}_{Z|H_0}(\Lambda|H_0) \tag{17}$$

where $\hat{F}_{Z|H_0}(\zeta|H_0)$ is the cumulative probability distribution of the non-dimensional test statistic $\zeta$ and Z' is simply the non-dimensional version of the random variable Z.

Determination of these thresholds requires the calculation of the noise power spectral density, which is trivial under $H_0$. During processing though, an estimate must be made under $H_1$ without knowledge of the spectral or temporal location of the signal. Using the entire segment will necessarily include some signal energy, but for a limit number of tags and/or low pulse power scenarios, the total signal energy will be relatively small and can be included without undue influence on the resulting threshold. In high SNR scenarios when this assumption cannot be made, amplitude thresholding of the time domain signal can be used to reduce the influence of the signal energy on the noise power estimate. Alternatively, priori estimates of signal bandwidth and/or transmission times could be used to exclude portions of the data. When pre-computing thresholds based on equation 16, it is may be helpful to note that the effect of the non-dimensional inter-pulse pulse time ($F_s t_{ip}$) on the thresholds is negligibly small for small perturbations to its nominal value.

The investment of human and machine resources in tracking can be very high, so that the cost of false detections is high. In various implementations, if a positive detection is declared for a segment, the next segment is examined to confirm the detection. Here it is appropriate to use the inter-pulse interval and spectral signature from the analysis of the previous segment to narrow the search space, and test if the maximum in that space exceeds the threshold. Thus the same putative signal is tested twice independently, yielding an overall false alarm probability of $P^2_F$.

In implementations where multiple tags are involved, detection of one tag's pulse train follows the two-step process of identifying the maximum-energy coherent multi-pulse correlation result per equation 12 and making the decision by comparing it to the threshold $\lambda$. In most research studies, multiple animals are tagged. To improve human trackers' ability to identify them, tags with different center frequencies are selected, so that only one tag is often in any post-decimation frequency band. However, if the pulse trains of $I \geq 2$ tags occur in the same post-decimation bandwidth, all coherent multi-pulse correlation outputs greater than $\lambda$ represent possible positive detections. In this case, the correlation results can be ordered and the highest I tested against the threshold. Positive detections are then subject to confirmation process using test statistics as described above.

A particular implementation of a method of detecting a plurality of pulses in a radio signal from a radio tag is subsequently described herein for the exemplary purposes of this disclosure. Other implementations, however, may be constructed using the principles previously described and those that will be subsequently described in this document. The implementation described here may be carried out in a way intended to be computationally more efficient than other approaches.

The implementation's goal is to temporally filter the data to capture only all possible pulse locations (minimizing the noise contribution) in the face of uncertainty about the location of the first pulse and the PRI. The algorithm presented is designed to achieve two goals: (1) minimum computational complexity, and (2) maximum computational efficiency. It achieves (1) by only computing each summand once and it achieves (2) by vectorizing sums to the maximum extent possible and enabling multi-threaded and multi-core implementations in various hardware implementations.

Figure 3:
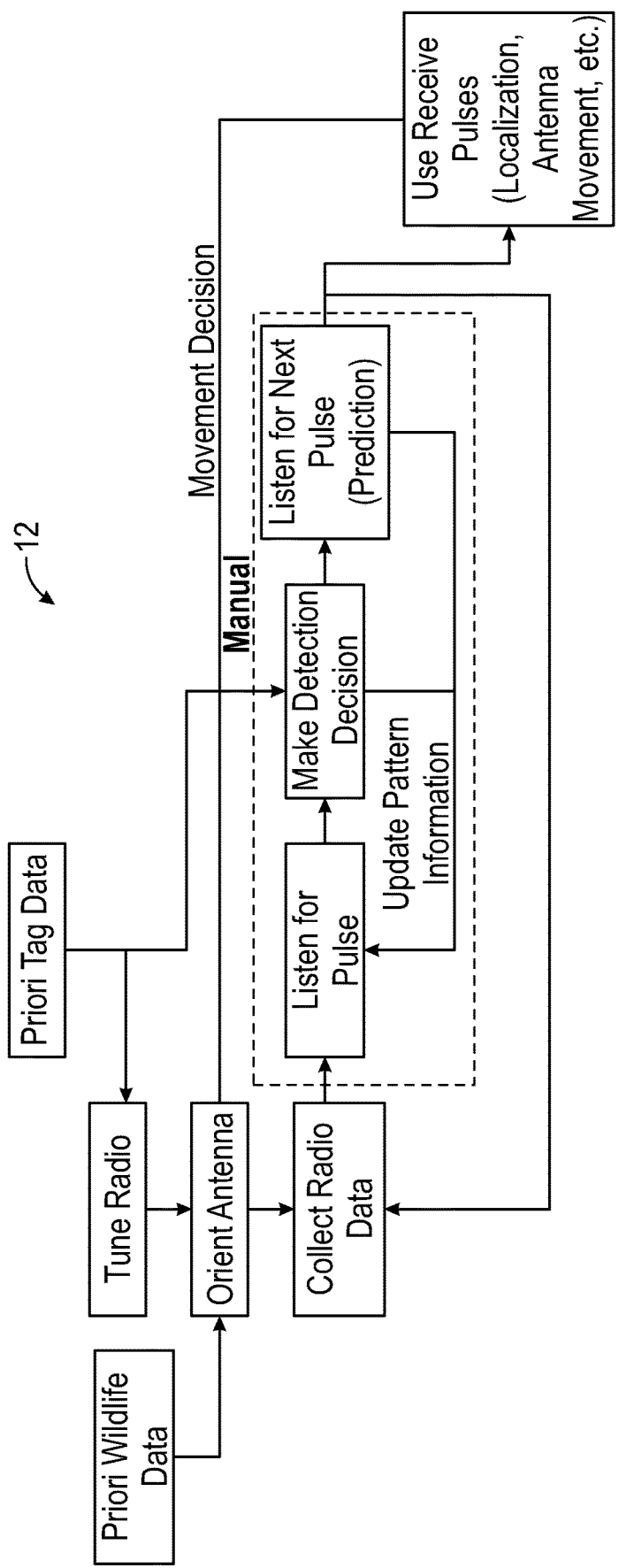
FIG. 3 is a flow diagram of an implementation of a manually operated radio tag tracking system that uses audible radio pulses.

Referring to FIG. 3, a flowchart of a method of manually localizing a radio tag is illustrated. As previously discussed, a manual method involves the use of a hand-held directional antenna connected to a radio that outputs an audible sound pulse when a radio pulse is received. Using a priori information about the center frequency of the radio tag desired to be tracked, the user tunes the radio, orients the antenna, collects radio data, and then listens for the pulse. Based on the sound, the user determines whether the proper radio tag has been located. The user then decides whether to reorient the antenna prior to listening to the next pulse. When the next pulse is received, the user then again can decide whether to reorient the antenna or whether a good bearing direction down the highest gain axis of the antenna to the radio tag has been determined based on the audio feedback. In practice, this process is repeated as the user walks toward the radio tag or walks in a pattern in an area as a bearing is first developed. This manual process is very time consuming and requires that the user be able to adequately receive the radio pulses from the radio tag basically within 6-8 feet of ground level, which makes attempting to locate animals that reside in shallow burrows, cracks in rocks, or caves, more difficult due to signal propagation issues.

Figure 4:
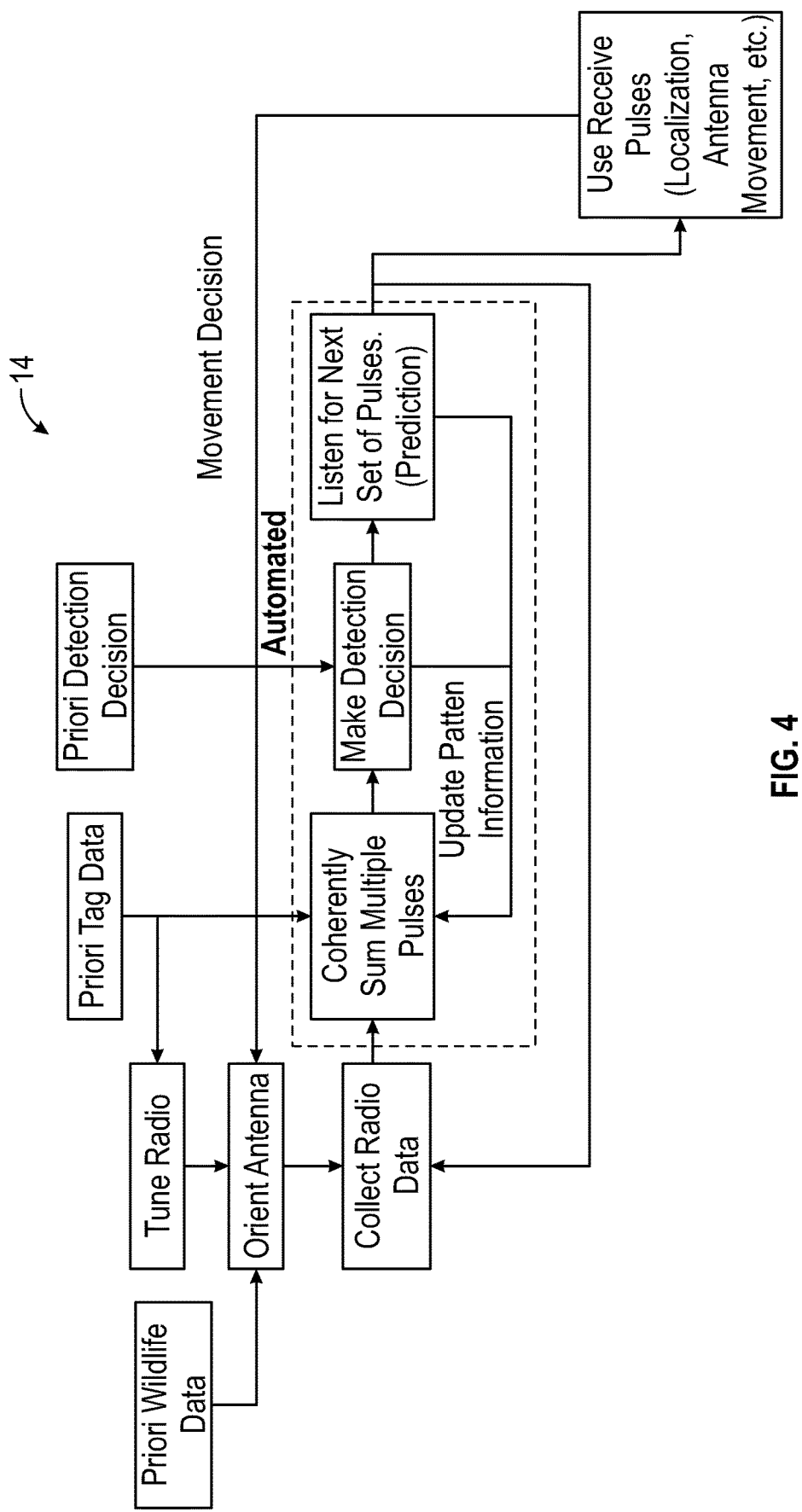
FIG. 4 is a flow diagram of an implementation of a method of using a radio tag tracking system like those disclosed herein.

At a high level, referring to FIG. 4, a flowchart of a method of detecting a plurality of radio pulses 14 is illustrated. In this method implementation, a priori information is available of the type of wildlife being tracked, frequency information about the radio tag associated with the wildlife, and the nominal pulse frequency for the radio tag. While the use of UAVs is illustrated as being used to carry the antenna and radio in to the sky far higher than what a human user can reach, the method implementation for detecting pulses could be utilized using a hand held antenna and hand carried radio in some implementations, with a corresponding decrease in accuracy because of higher SNR from such signals. In all implementations, the directional antenna is oriented while radio data is collected using a SDR radio. While the implementation of FIG. 4 indicates that the radio data is then processed using the techniques previously described and which will be described hereafter to coherently sum multiple pulses, in other implementations, incoherent combining using the principles disclosed herein may be used as well. Based on the results of the combining of the pulses, a detection decision is made as to the location of a predetermined number of pulses in the radio data. This determination is made using a signal processor associated with the base station which may be included in the base station or may be a separate computing device coupled to the base station. The detection decision is made automatically by the system, and then in various method implementations the system listens for a future predetermined number of future pulses using a prediction of when in the time sequence the future pulses will arrive. With the results of the future pulses, various method implementations will then track the radio tag signal and calculate a bearing. With the bearing to the tag, various method implementations will provide a movement decision/recommendation to the UAV or user to adjust the orientation of the antenna. Following sufficient data collection, the method may include calculating a bearing to the radio tag using any of the method implementations disclosed in this document.

Figure 5:
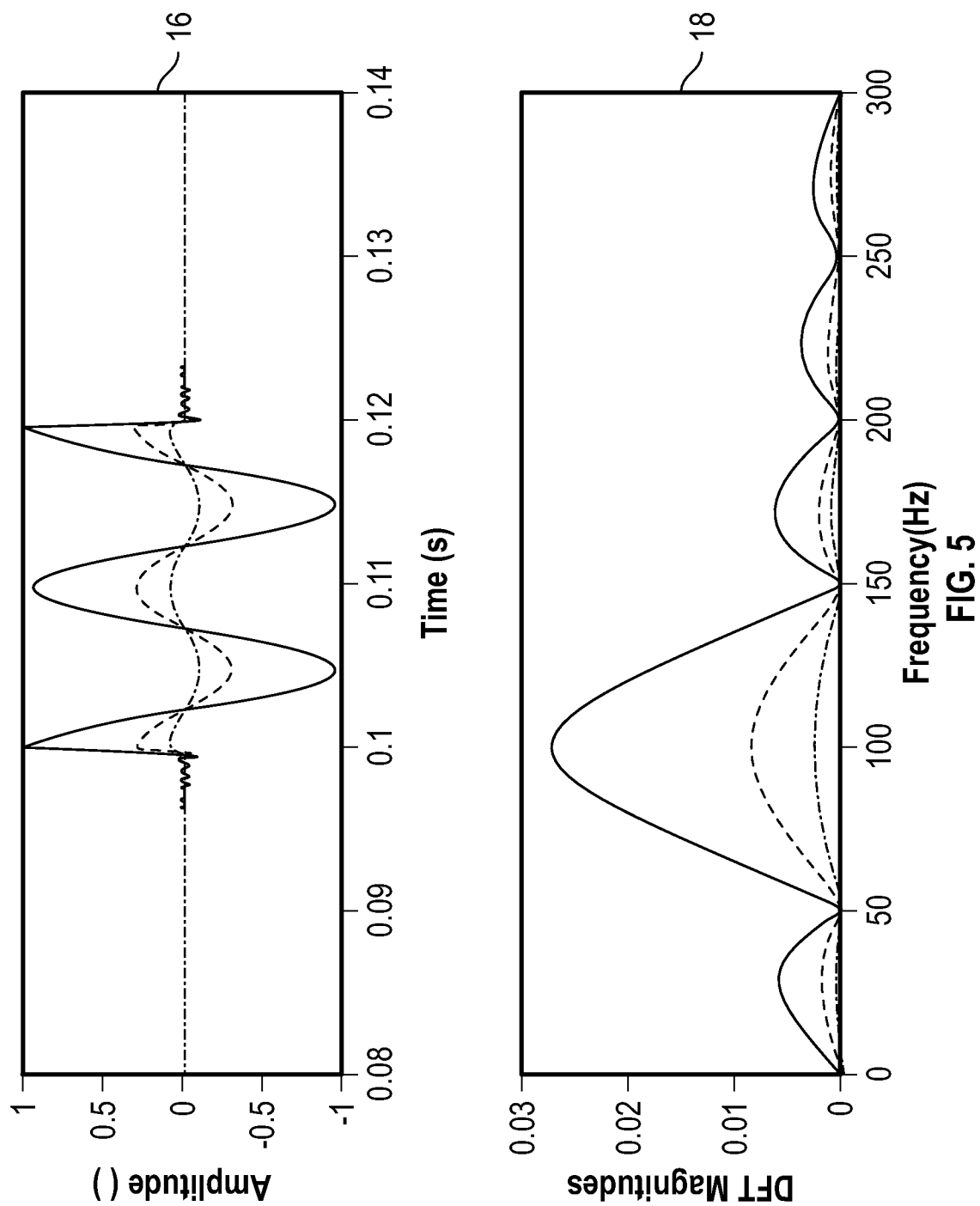
FIG. 5 is a time domain and discrete Fourier transformed frequency domain graph of a radio pulse signal.
Figure 6:
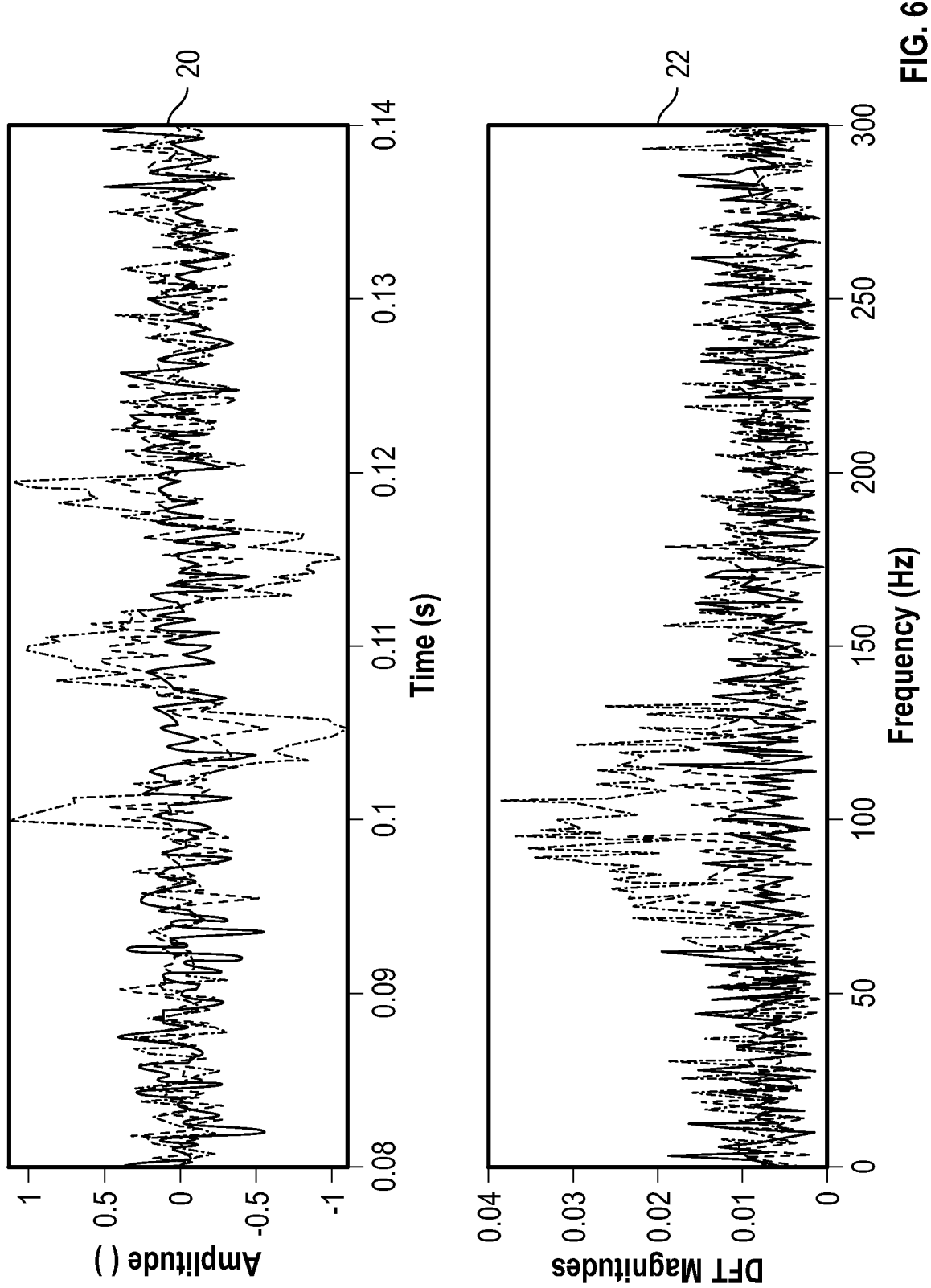
FIG. 6 is a time domain and discrete Fourier transformed frequency domain graph of a radio pulse signal with noise.

The concepts of discrete Fourier transforms and short-time Fourier transforms have been previously discussed in this document. Examples of what is happening in the time and frequency domain for each can be found in the following figures. FIG. 5 illustrates a radio pulse in the time domain in the top graph 16 where the highest frequency portion of the pulse occurs at the center of the pulse. In the bottom graph 18 the discrete Fourier transform of the radio pulse is illustrated, showing that the maximum magnitude of the DFT occurs at the highest frequency point in time of the pulse. Thus the DFT permits transformation of the pulse from the time to the frequency domain. The figures illustrated in FIG. 5 were artificial signals without noise. FIG. 6 illustrates a time domain graph 20 of the pulse of FIG. 5 with noise added and the corresponding DFT magnitude graph 22 that shows that the maximum still occurs at the highest observed frequency point of the pulse. The introduction of noise means that the use of probability statistics will be needed to confirm whether an observed maximum magnitude on the DFT graph 22 actually is a global maximum or is instead only a local maximum resulting from noise.

Figure 7:
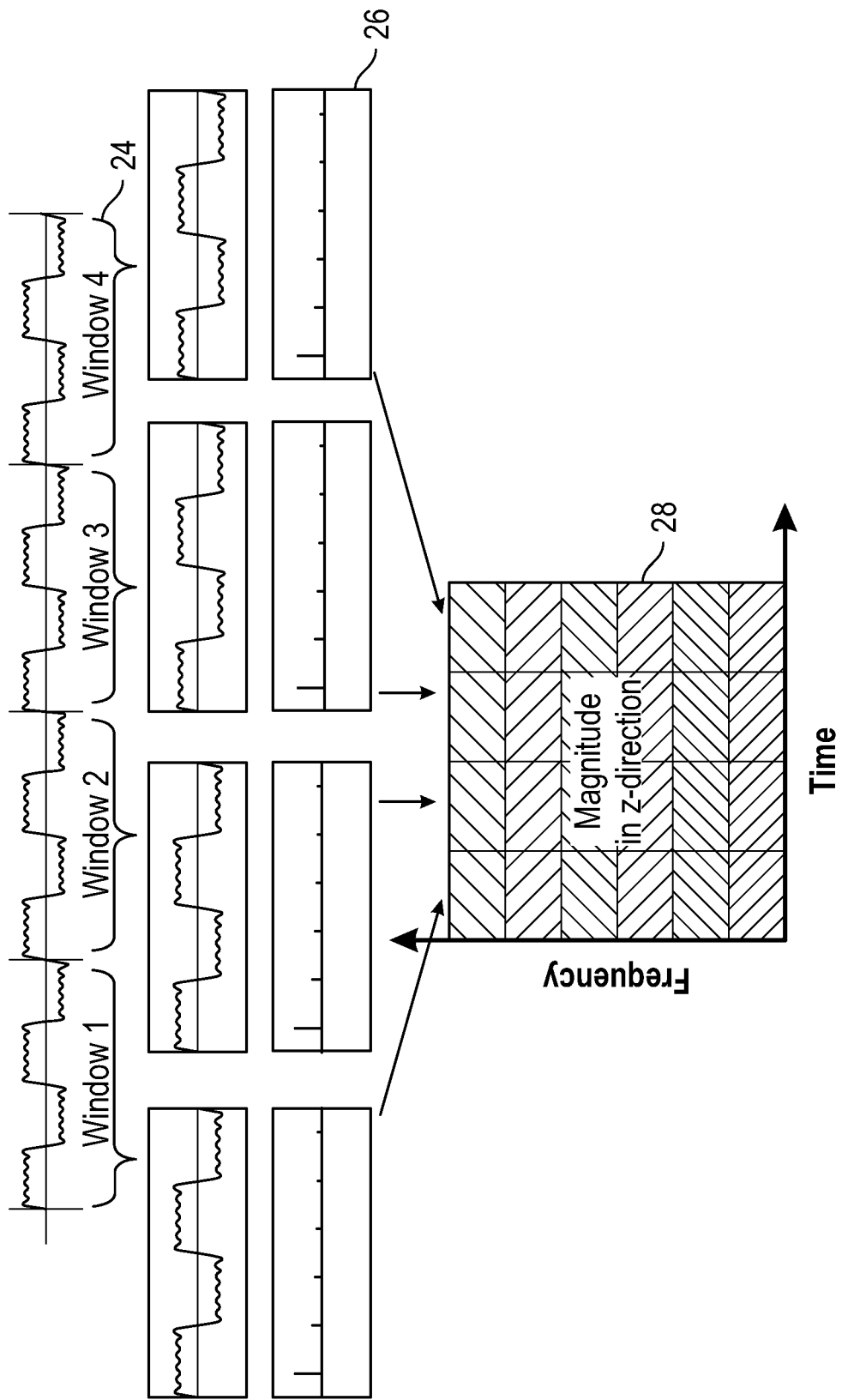
FIG. 7 is a diagram of multiple pulses where short-time Fourier transforms have been taken of four time windows and the resulting transformed summed to form a matrix.
Figure 8:
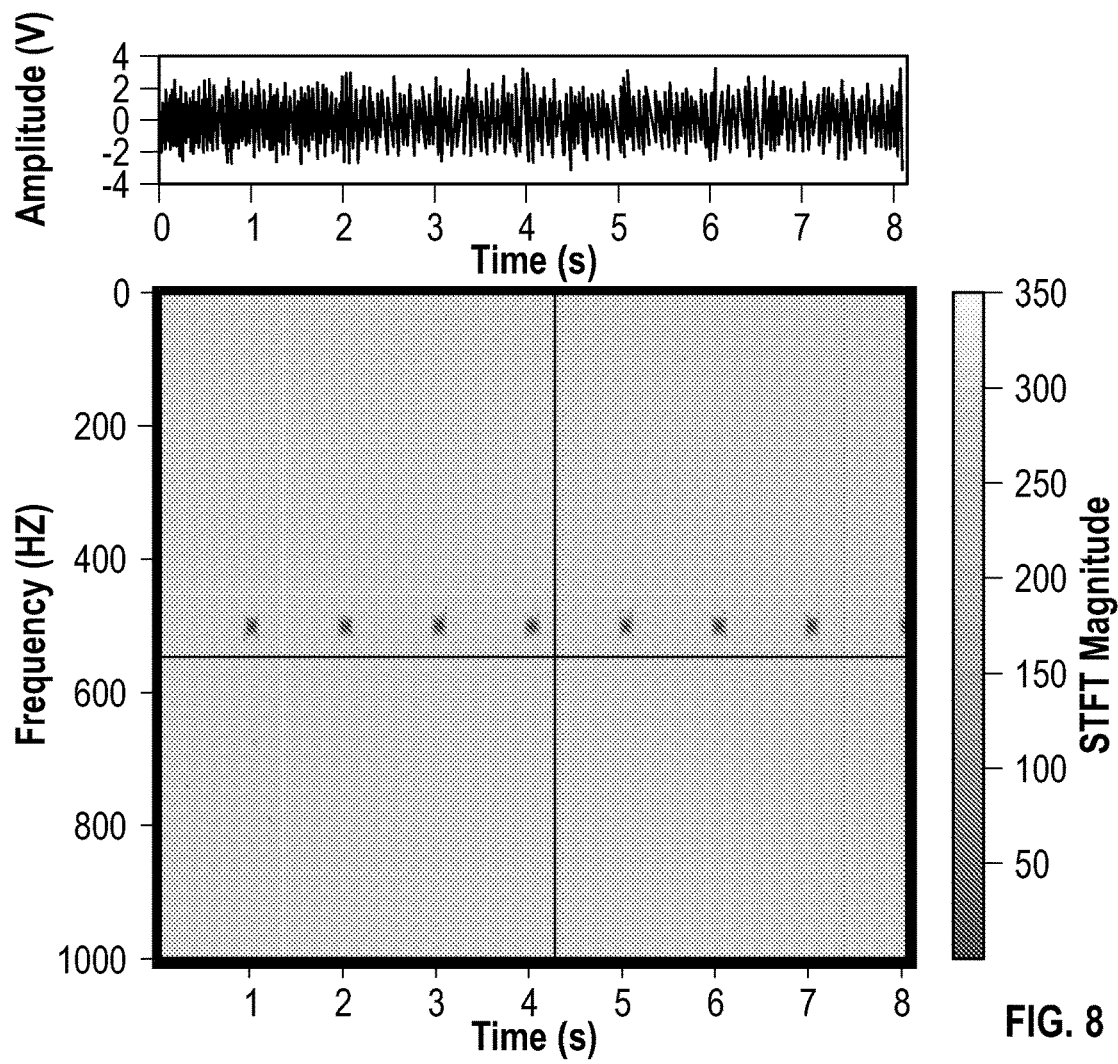
FIG. 8 is a spectrogram of a synthetic pulse signal implementation.
Figure 9:
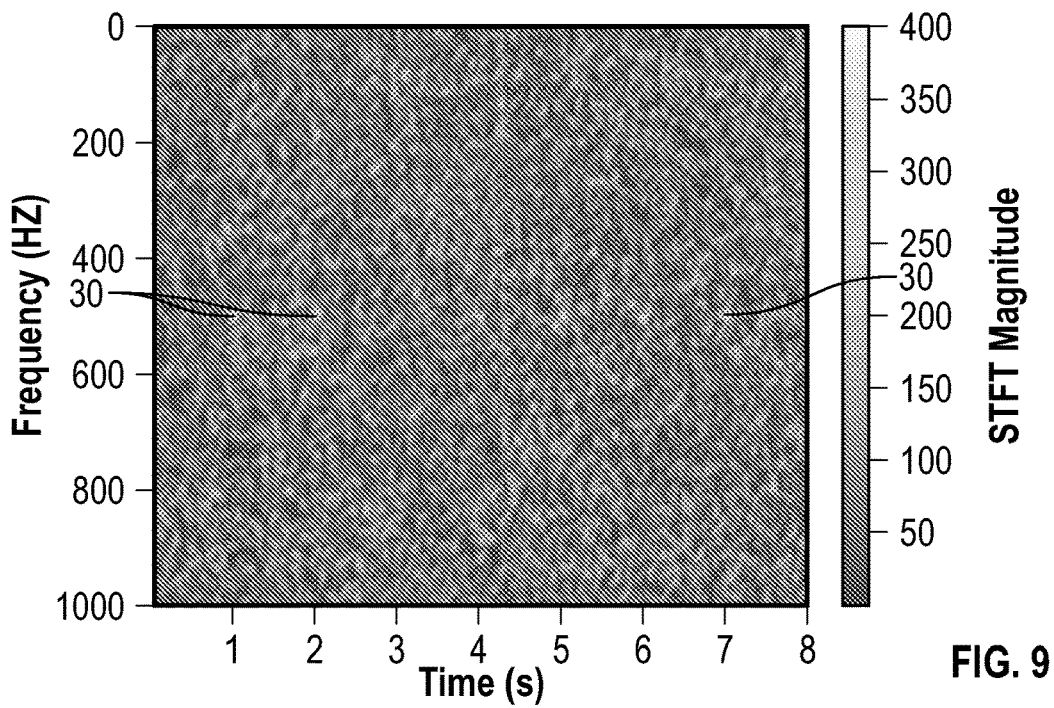
FIG. 9 is a spectrogram of a pulse signal implementation that includes noise.
Figure 10:
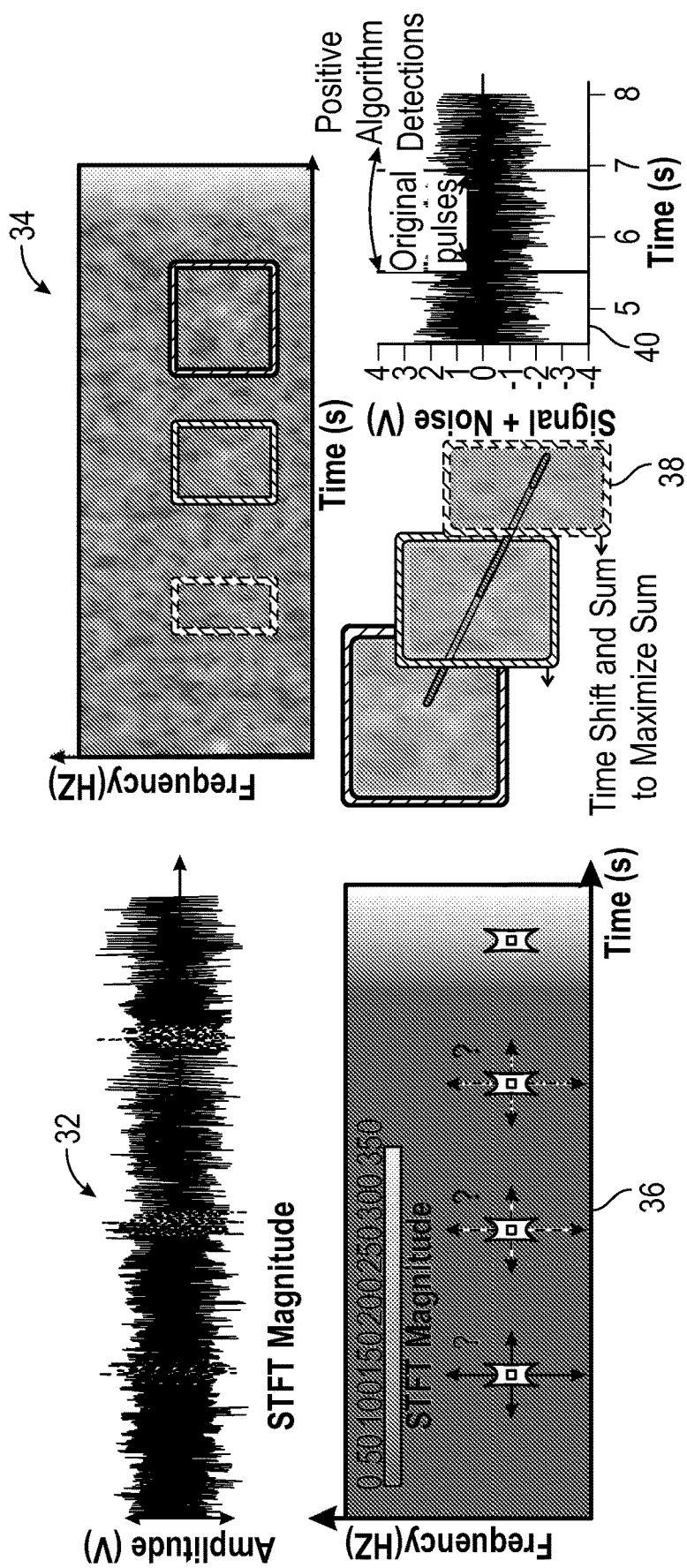
FIG. 10 is a diagram of an overview of a process implementation for time shifting and summing magnitude values of the short-time Fourier transform of three windowed regions of radio data to detect the time and frequency of pulses in the radio data.

FIG. 7 illustrates how the use of short-time Fourier transforms (STFTs) permits a set of time domain radio pulses to be windowed into specific short time intervals 24 and then converted into a set of frequency domain signals with local maxima 26 which then can be added and plotted in a frequency versus time spectrogram 28 where intensities on the spectrogram represent the magnitude of the frequency domain value in the z-direction coming out of the paper. FIG. 8 illustrates a spectrogram of a synthetic pulse signal without noise that shows the location of each pulse in a lighter color according to the STFT magnitude shading legend on the right indicating that the pulse is extending toward the viewer out of the paper. A more typical signal is illustrated in FIG. 9, where the pulses 30 can still be detected but are much harder to discern as their magnitude tends to blend into the surrounding frequency noise. FIG. 10 illustrates graphs that show how a time domain signal 32 at the upper right is converted to frequency domain in the form of spectrogram 34. The graph 36 illustrates how the location of each pulse is uncertain in the frequency and time directions due to noise present in the radio data received. In order to maximize the ability to detect each pulse, graph 38 shows how three windowed regions with differing size in time are time shifted and summed to maximize the ability to detect an actual radio pulse. Graph 40 then illustrates how with the detected pulse information various method implementations employ predictive algorithms to allow for detection and tracking of future pulses in the time domain. This approach helps handle automatic variations in pulse frequency and pulse repetition rates caused by variation in the components of the particular radio tag being tracked.

An overview of a more detailed presentation of a method implementation that employs the efficient algorithm discussed previously is shown graphically in FIG. 11. From the previous discussion, the method considers a discrete complex sequence r. From this, the method extracts a segment that is of sufficient length to always contain at least K pulses, including all uncertainties in initial pulse location and interpulse time. Each segment will contain K blocks of time windows ($B_k$) which are known through a priori predictions or shear size to each contain one pulse. In various method implementations, the method first determines the size of the segment and its block in terms of both sequence index and STFT window index.

The coherent single pulse correlation can be executed via the STFT of the segment of r, producing the matrix X (see FIG. 2). The smoothing window g can be applied during this operation in various implementations. The following discusses methods of calculating the necessary segment size to ensure K pulses are captured for processing and the selection and arrangement of time windows (w) within X to isolate individual pulses. In various method implementations, all or a subset of its frequency bins ($f_b$) may be used, reflective of a priori certainty of pulse frequency. The STFT is then computed with a time window width of $n_w$ samples in r, which is set equal to the duration of a single pulse with width $n_p$. If the fractional time window overlap is OLF, the number overlapped samples between adjacent windows would be $n_{ol}=\lceil n_w OLF\rceil$. Therefore, each window steps forward by $n_{ws}=n_w-n_{ol}$, with the time between each subsequent windows being $t_{ws}=n_{ws}/F_s$. Given these definitions, the interpulse time $\tau_{ip}$ can be expressed as a number of STFT windows. We would expect a repetition of a pulse after the $N^{th}$ window, or $N=\lceil n_{ip}/n_{ws}\rceil$. The variable $n_{ip}$ is the interpulse time represented as samples, or $n_{ip}=\lceil \tau_{ip}F_s\rceil$. The uncertainty of the interpulse time can be defined in units STFT windows rather than seconds. Assuming the interpulse time is known to be $\tau_{ip}\pm\tau_{ipu}$, then the location of sequential pulses would be known within $\pm M=\pm\lceil t_{ipu}/t_{ws}\rceil$ STFT windows.

In order to define the segment and block lengths necessary to contain K pulses, there is expanding uncertainty in the pulse location as the method looks forward in time. To handle this uncertainty, the method develops block and segment definitions as described here that assume no prior knowledge of the first pulse within the segment, and then modify the result for cases when the location of the first pulse can be estimated from a prior segment.

Figure 12:
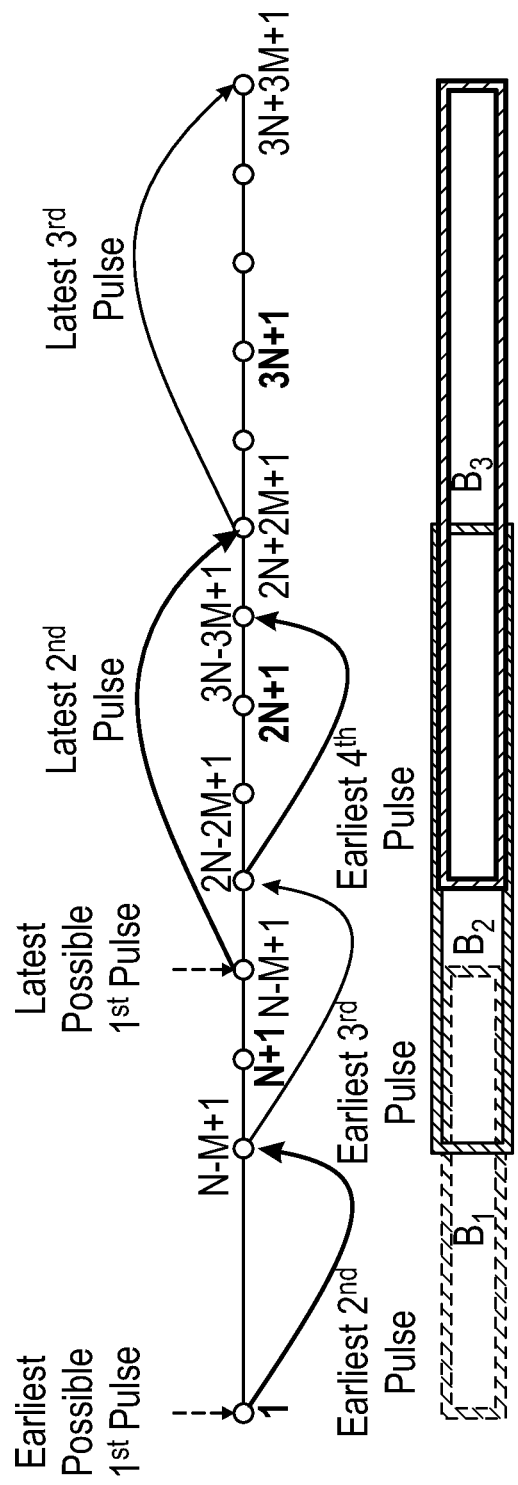
FIG. 12 is a timing diagram outlining the spacing and sequencing of various time windows used in various system and method implementations disclosed herein.

Referring to FIG. 12, with no prior knowledge, a pulse is assured to occur within the first N+M+1 time windows, which also serves as the boundary of block 1 (B1) within the segment. The first pulse could arrive at window 1 within this block, but could arrive as late as window N+M+1. From this initial range, the method implementations project forward to the earliest and latest possible arrival of the subsequent pulse. If the first pulse was early and arrived at window 1, the earliest second pulse could come at window N−M+1. If the first pulse was late and arrived at window N+M+1 the latest arrival of the second pulse would occur at window 2N+2M+1. Therefore, the second block would be defined to contain windows N−M+1 through 2N+2M+1. Using a similar process to determine the size of subsequent blocks, it is apparent that STFT segments containing K(N+M)+1 windows are needed in order to have certainty of capturing K pulses. This would represent a time band of $t_{ws}(K(N+M)+1)$ seconds or $n_{ws}(K(N+M)+1)$ samples, quantities useful in segment definitions. Additionally, generally, the $k^{th}$ pulse would be expected in the range of windows $(k-1)(N-M)+1<w<k(N+M)+1$, where w represents the window number within X. This range serves as the time window boundary of each of the K blocks within the segment.

Figure 11:
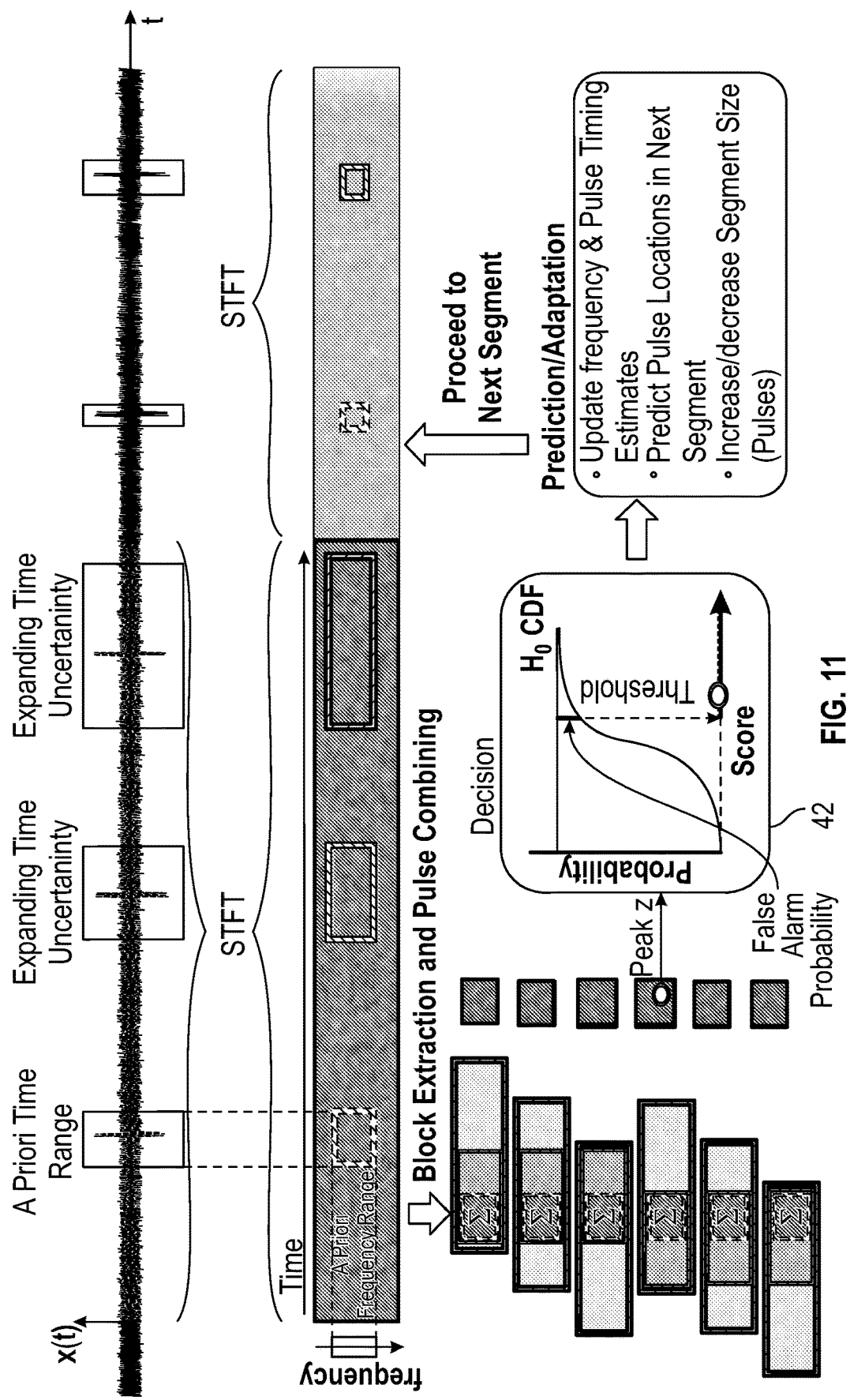
FIG. 11 is a diagram of an overview of another process implementation for time shifting and summing magnitude values of the short-time Fourier transform of three windowed regions of radio data to detect the time and frequency of pulses in the radio data.

In method implementations with prior knowledge (either from previous calculation or a prior knowledge), an estimate of the first pulse location within the segment can be calculated that can help to reduce the number of windows under consideration (see block size reduction in FIG. 11 between STFT segments 1 and 2). Such a reduction serves to nonlinearly reduce the subsequent computational effort. If pulse 1 is expected to be within a refined search band of time windows $p_1\leq w\leq p_2$ then the $k^{th}$ pulse would be expected in windows $p_1+(k-1)(N+M)<w<p_2+(k-1)(N+M)$. Notice that this reduces to the previously described window band for the naïve case where no knowledge of the first pulse location is had, or $p_1=1$ and $p_2=N+M+1$.

With X computed for a segment within r, and K blocks of time and frequency $B_i$ extracted from X, the method includes implementing an efficient method of combining pulses with these blocks. Consider here that each extracted block is a matrix itself, a subset of the larger X. The method includes first computing the square of the magnitudes of each element of each block, implementing a portion of equation 11. The pulses are summed in time (the summation of equation 11) through shifting the matrices in the time window index, while maintaining alignment of the frequency bins. The method assumes, at least among the K pulses considered for the processing of one segment, that the spectral energy distribution is close to constant from pulse to pulse. This method could be extended to align pulses both in time and frequency, but may be computationally intractable for real-time processing.

Figure 13:
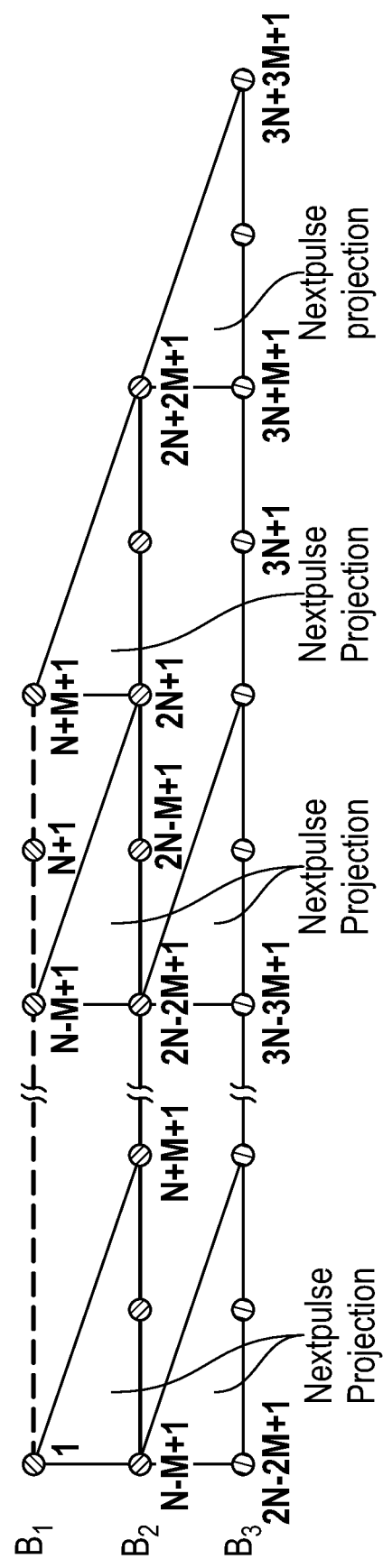
FIG. 13 is a corresponding diagram outlining notation used for the sizes of the three time windows illustrated in FIG. 12.

Referring to FIG. 13, to illustrate the concept for the case of K=3, the method first maps the time windows of each block, aligning the earliest window of each block. In this arrangement the projection of expected subsequent pulses is observed; if a pulse is located at window 1 in block 1, the subsequent pulse would be expected in block 2 between windows N M+1 and N+M+1. By inspection, block 2 would need to be shifted left (led) somewhere between 0 and 2M time windows to align the first pulse with the second. If the first pulse occurred later in $B_1$, the same amount of shifting of $B_2$ would be required to assure alignment of the pulse within $B_2$. This arrangement of time windows and uncertainty projections can be extended for any number of blocks. As illustrated in FIGS. 12 and 13, $B_3$ would involve shifts of between $0\leq l\leq 2m$ in order to align its pulse with that of block 2.

The method now uses blocks of the STFT segment ($B_k$) to add pulse energy. In the method implementations, the goal is to temporally align the pulses so their magnitudes sum, but ensure that each possible combination is only computed once. To do so, the method first utilizes a shift-sum operation, which first column shifts one matrix by −1, $S(B_{(i,j)}, 1)=B_{(i,j+1)}$, and then sums the result with a second matrix, $C=A+S(B, 1)$. Here the size of A and B need not be equal, as the sum operation is defined to occur only over the elements of A and B that overlap. Therefore, the size of C is the same as A. This operation is performed for all shifts necessary (2M+1 times in this situation), and thus produces an equivalent number of resulting matrices.

With this operation defined, the method implementations first shift-sums the last block $B_K$ with second to last block $B_{K-1}$. The 2M+1 resulting matrices are each then shift-summed with block K−2 so on until finally shift-summing with block 1. For the case when K=3, the result of shift-summing all blocks would be $$Z_{l_1,l_2}=B_1+S(B_2++S(B_3,l_1),l_2) \quad (18)$$

where $0 \leq l^* \leq 2M$.

Each resulting Z matrix represents the sums of the magnitudes of the Fourier coefficients of the STFT blocks after column shifting, or the output of equation 11 for all $\omega$. Notice the $l_1$, $l_2$ subscript on the Z matrix, indicating one matrix of each value of $l_1$ and $l_2$. As such, the number of matrices increases by a factor 2M+1 after each sequential shift-sum step. The number of matrices considered in each step grows nonlinearly with each step with $(2M+1)^{K-1}$ matrices used at the end of the algorithm. Given the range of each shift, there would be $4M^2+4M+1$ Z matrices for K=3. For high uncertainty (large M) or large K, this growth (exponential in K and power in M) can outstrip memory capacity, even where speed of processing is not considered, and serves as a limit on this method's final SNR improvement ability. Reductions in pulse repetition interval uncertainty may allow for a larger K, which has been shown to linearly increase the resulting SNR.

In the case where the primary transmission frequency falls between STFT frequency bins, the spreading of the energy across bins could reduce sensitivity. Moreover, to recover energy spread across bins due to the pulse duration, shape, or phase, method implementations may utilize a weighted integration across multiple frequencies in each time window in each Z matrix: a matched correlation template. Applying this template to the output as $$Z_{w,l_1,l_2,\ldots,l_{K-1}}=W^H Z_{l_1,l_2,\ldots,l_{K-1}} \quad (19)$$

bin weighting vector $w=[w_1, w_2, \ldots, w_i]$ in each column, but each column is circularly shifted down one row. For example, a five element w vector would generate the associated matrix $$W^H = \begin{bmatrix} w_1^* & w_2^* & w_3^* & w_4^* \\ w_4^* & w_1^* & w_2^* & w_3^* \\ w_3^* & w_4^* & w_1^* & w_2^* \\ w_2^* & w_3^* & w_4^* & w_1^* \end{bmatrix} \quad (20)$$

The length of the weighting vector is equal to the number of frequency bins (rows of Z). We denote the complex conjugate of $w_i$ here as $w_i^*$. If the general pulse shape is known, the weighting vector would be equal to the DFT of the pulse in the time domain. The application of the W matrix on Z in this way efficiently translates the template across all frequency bins.

It should be noted that in various method implementations this weighting via application of the W matrix on Z can be applied before or after the shift-sum operation. The operation in equation 18 is a sum of parts of the STFT matrix with shifting of some time windows, but it does not affect the frequency bins. As such, the STFT matrix itself could be weighted by W prior to the extraction of blocks and the application of equation 18. In fact, in various method and system implementations, doing this may be computationally expeditious, as the magnitude operation of equation 11 could then also be applied prior to the shift-sum operation. This sequence of steps converts the STFT matrix, and accordingly the blocks extracted therefrom, to real valued magnitudes. This sequence of operations may reduce memory requirements and decrease the time required for the shift-sum operations, which are the primary computation expense when implementations of the method are implemented using a signal processor.

Using these weightings, various method implementations find a maximum across all shifts and frequencies, or $$z_{w,l_1,l_2,\ldots l_{K-1}} = \max_{w \in \Omega} Z_{w,l_1,l_2,\ldots l_{K-1}} \quad (21)$$

For each shift combination $(l_1, l_2, \ldots, l_{K-1})$, a z score would be produced, resulting in $(2M+1)^{K-1}$ listing of scores, $Z_{map}$. The maximum element of $Z_{map}$ indicates which shift combination produced the highest coherence score, and therefore indicates which Z matrix should be considered. In various method implementations, the Z matrix with the highest z score is designated as $Z_{max}$. Because of the sequential summation, beginning at the last block and ending at the first, each Z matrix maintains the same relationship with frequency and time windows as the first block $B_0$. Therefore the location of the maximum within the $Z_{max}$ matrix corresponds to the pulse frequency (row in $B_0$) and time window (column in $B_0$ of the first pulse within block $B_0$. The time window of the second pulse would accordingly be $N-M+l_2$ windows greater than that of pulse 1. Other pulses could be found in a similar manner is various method implementations. With the list of candidate pulse locations, method implementations employ a decision model in order to determine the probability that each candidate is a true pulse. This decision model employs the cumulative distribution function previously discussed and as illustrated as graph 42 in FIG. 11. As previously discussed, the distribution utilized may be the Erlang distribution (see Appendix A as well). A predetermined false alarm probability (5%, 2%, etc.) may be utilized in various method implementations to help with accuracy tuning in various SNR and signal strength situations.

Figure 17:
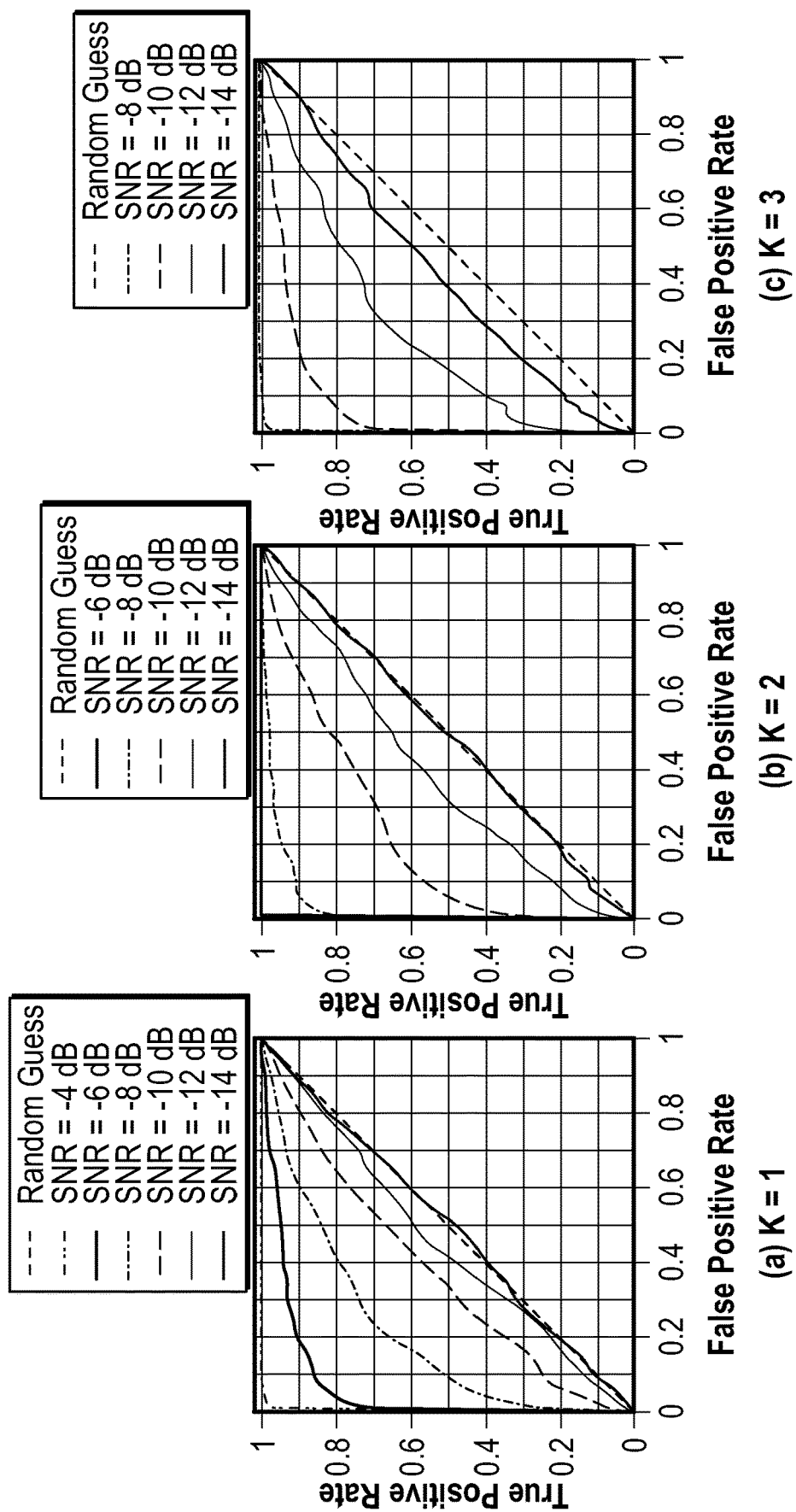
FIG. 17 are three diagrams of detection rates by SNR for one, two, and three time window method implementations.

In various method implementations, the ability to detect a true pulse is a factor of the number of blocks. Referring to FIG. 17, the performance of the method for K=1, 2, and 3 illustrated at different SNR levels and compared to a random guess. As can be seen, for K=1, an SNR of −4 dB is needed for near perfect detection, for that values is reduced to −8 dB when K=3 and three pulses are combined.

Figure 14:
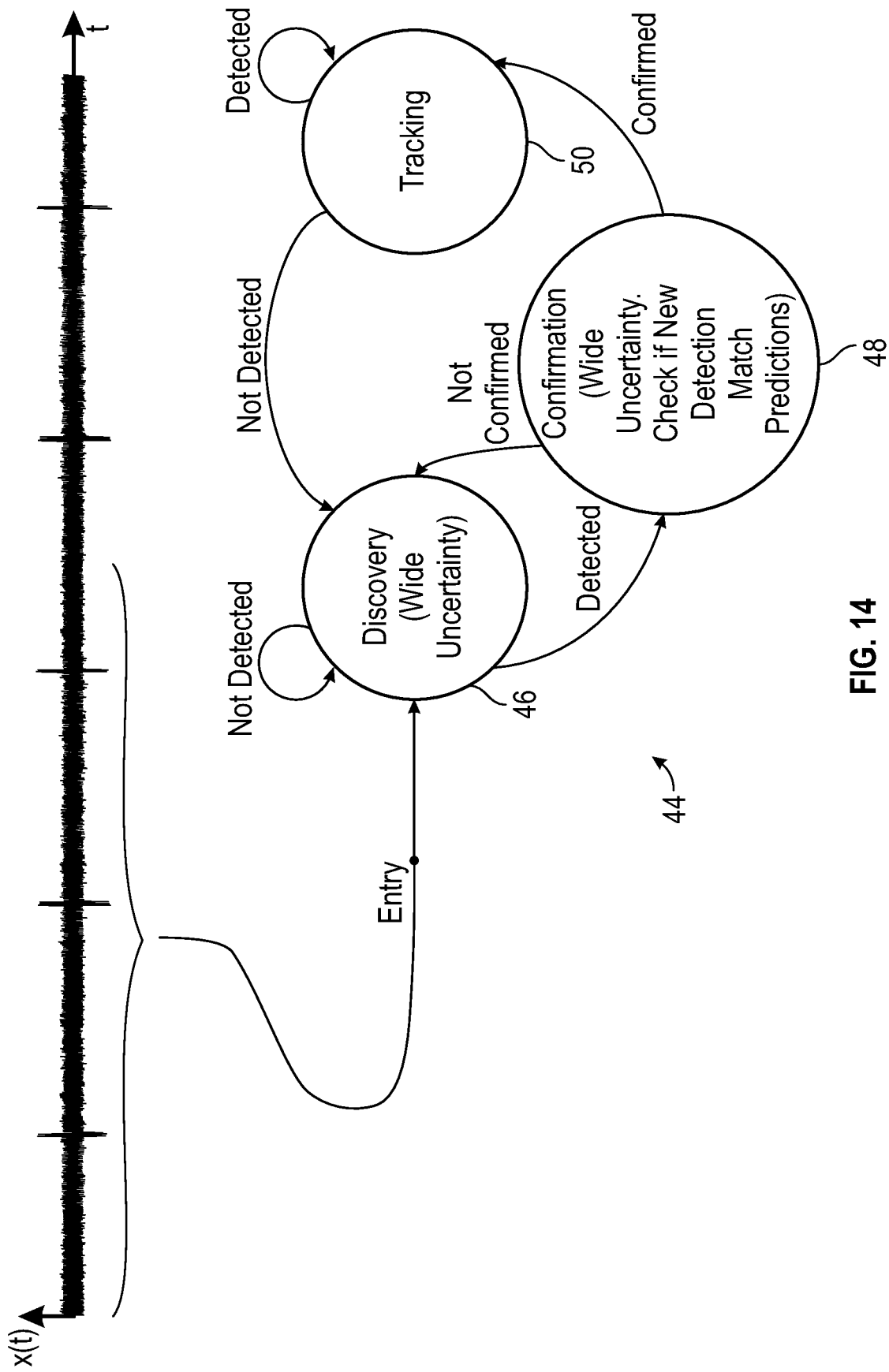
FIG. 14 is a state machine diagram of an implementation of discovering the time location of three pulses, confirming the time location, and then tracking the time location of subsequent pulses.

Following application of the detection portion of the method, detected times for the initial pulses (1, 2, or 3) can be used to predict times for subsequent future pulses. As previously discussed, with these predicted times, the system can then utilize the directional antenna and the SDR to listen and then use the radio data processing methods to identify whether pulses from the radio tag being sought appear as predicted. If so, the method can move in to a tracking phase. Referring to FIG. 14, this process is illustrated in the form of a state machine 44. During the initial entry and Discovery phases 46, the radio data is processed using the pulse time detection methods previously discussed and then the resulting candidate pulses are tested to determine whether true pulses have been detected in the Confirmation phase 48. During the Confirmation phase 48 the predicted future times for future pulses (1, 2, 3, etc.) are verified using radio data from a second pulse window. If the Confirmation phase 48 returns a confirmation that the predicted pulse times align with the actual pulse times of the newly received pulses, then the state machine 44 enters a Tracking phase 50 where the prediction of pulse timing continues to run followed by confirmation/verification of each pulse as it is received.

Figure 15:
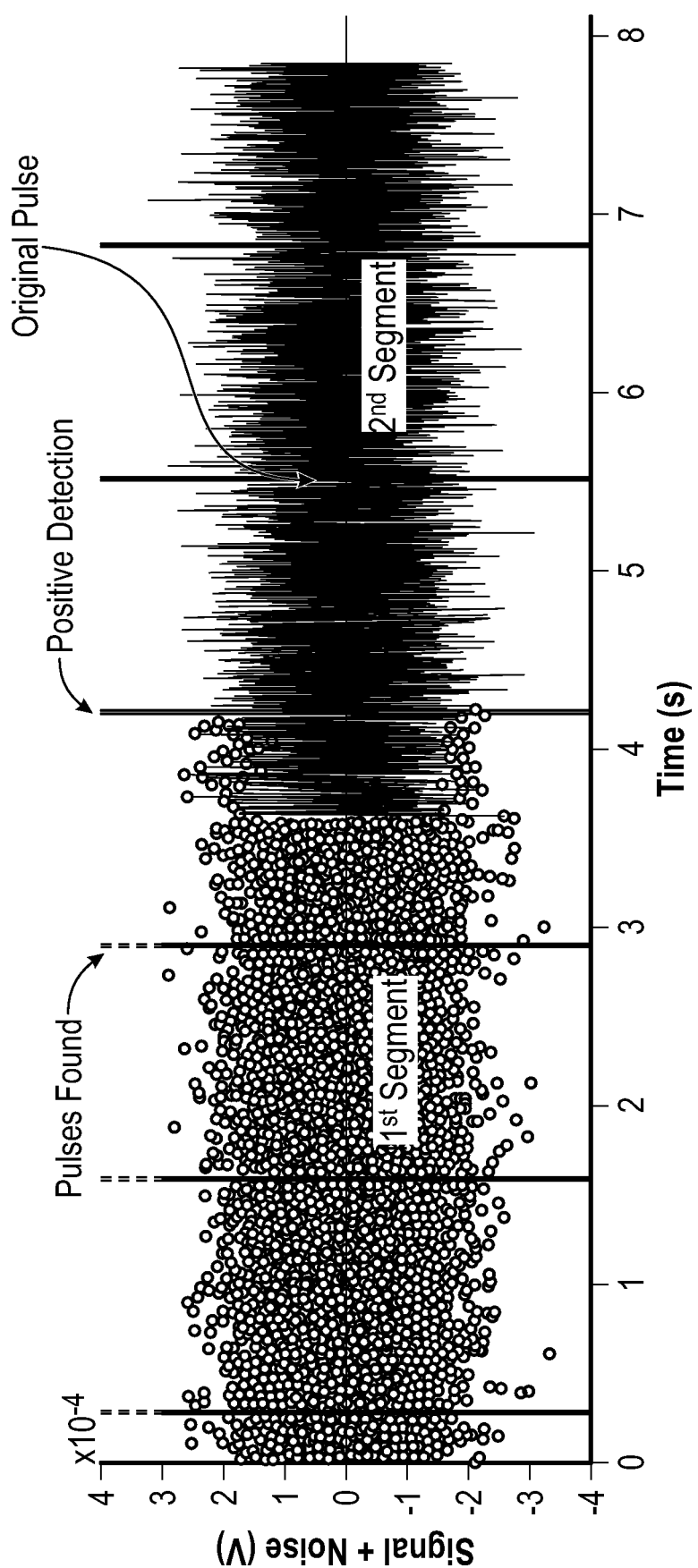
FIG. 15 is a graph of a series of six pulses detected in an artificial pulse signal at a signal-to-noise ratio (SNR) of −18 dB at 48 kHz sampling.
Figure 16:
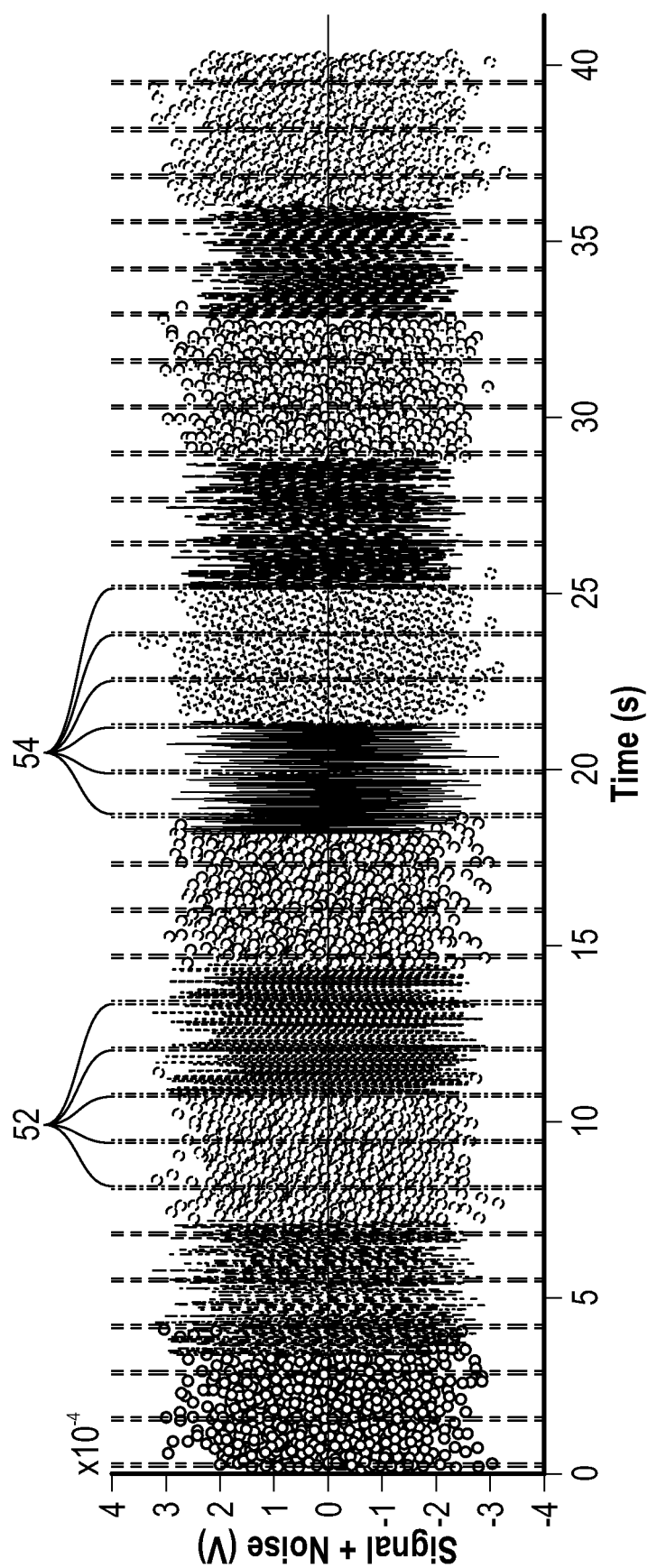
FIG. 16 is a graph of a series of 30 pulses detected in an artificial pulse signal at an SNR of −20 dB at 48 kHz sampling.

FIG. 15 illustrates an example of detection of pulses from a simulated signal that had 6 pulses with white noise added to create a SNR of −18 dB sampled at 48 kHz. The pulses were divided into two segments with the first three pulses used in the first segment to predict the timing of the next three. As illustrated, the method implementation found all six pulses in the signal. FIG. 16 illustrates another simulated signal that contained 30 pulses with white noise added to create an SNR of −20 dB sampled at 48 kHz. As illustrated, the method and system implementation found all of the pulses, but classified pulses 52 and 54 as noise. This experiment demonstrated a performance limit for this implementation at the SNR of −20 dB at 48 kHz (−6.6 dB at 4 kHz sampling). For comparison, a human expert's detection limit is between −15 to −16 dB at 48 kHz meaning the system is able to improve detectability at about 4 to 5 dB which represents a 2-3× improvement in sensitivity over the manual radio approach.

The detectability of various radio tag signals is a function of the sampling frequency in various method implementations. For example, where 4 kHz sampling is used, for detectability to be effective, the radio tag's center frequency needs to be within +/−2 kHz of the tag's frequency (149.998 MHz<150 MHz<150.002 MHz. However, at higher sampling rates, the deviation from center frequency can be much higher as recording at 48 kHz permits ranges as large as +/−24 kHz to be used.

Once the pulses are identified and system is able to track the radio tag with radio data, various method implementations may be employed to identify a bearing (direction) to the radio tag identified and tracked. The use of UAV system implementations like those disclosed herein may be particularly useful in assisting the signal processor of the base station in identifying bearings using various flight patterns involving waypoints for radio data collection. Various examples of these will be discussed further in this document.

The manual radio DOA search method (azimuthal scanning) of scanning circularly at a given location is implemented using the UAV by rotating the UAV in place as it hovers at a waypoint, scanning in yaw for a predetermined time period. In various implementations, six rotations at 25°/s have been used, resulting in 65 received pulses at each waypoint for a 1.32-s tag pulse interval. While this results in data collection times of 1.5 min per waypoint, other method implementations may use less time per waypoint with little effect on error.

After processing of the radio data received at each waypoint to identify the pulses in the data, a bearing estimate is needed. Simply taking the bearing of the maximum pulse amplitude is susceptible to errors and noise in the antenna orientation and the received power measurements. Implementations of methods of detecting a radio tag like those disclosed in this document may utilize principal component analysis (PCA) to leverage all received pulses at a waypoint. PCA is a method of determining the set of axes in a dataset for which the data have the largest variance. The method first determines the pulse power relative to an earth-fixed reference frame from the antenna frame. After developing this data matrix, the method utilized a PCA analysis to determine the direction of the received signal. It is important to note that, as PCA can be thought of as fitting an ellipsoid scattered data, a complete 360° scan of each axis of interest is generally necessary.

During a PCA analysis, the method assumes the UAV has collected a sequence of n pulses, each with a strength metric Pi and a synchronized antenna heading ($\psi_{a,i}$), pitch ($\theta_{a,i}$) and roll ($\phi_{a,i}$). The strength metric could be the signal power (in mW or dB), but must be positive. The signal amplitude or signal-to-noise ratio could also be evaluated in various method implementations. In this method implementation, the pulse power (mW) is used, and then normalized by the minimum pulse power at that waypoint. The resulting linear scaling of normalized power (mW/mW) was noted to provide lower errors than a log scaling in field tests, but other directional antennas may show improved errors with alternate scalings. In this method implementation waypoint-average pulse strengths scale coefficients and vectors were used, so datasets were interpolated over a uniform angular grid if there is significant angular non-uniformity in the original spacing.

The pulse strength metric Pi measured in the antenna reference frame is transformed to an earth-fixed frame through Euler rotations. If the antenna and vehicle frames are aligned and the vehicle performs a hovering yaw scan, the transformation consists of a single z-axis rotation using the vehicle's heading angle ($\psi_{v,i}$). In this case, the result of the transformation is a pulse vector whose magnitude is equal to the original measured pulse strength, but expressed with x (+North) and y (+East) components in the earth frame: $\vec{P}_{e,j}=[P_i \cos \psi_{v,i} \; P_i \sin \psi_{v,j}]^T$. The transposed individual pulse vectors $\vec{P}_{e,j}$ can be concatenated into $$P_e^* = \begin{bmatrix} \vec{P_{e,1}^T} \\ \vec{P_{e,2}^T} \\ \vdots \\ \vec{P_{e,n}^T} \end{bmatrix} \tag{22}$$

If the vehicle or antenna are rotated by all three angles, $P_e$ would be an n×3 matrix of row vectors of $P_i$ in the earth-fixed frame, with the x, y and z components in the first, second and third columns respectively. More typically, roll and pitch are zero, so only the first two columns (x and y components) of $P_e$ are needed. The asymmetric gain pattern of many antennas will result in nonzero column averages of this matrix, yet PCA requires a zero-mean dataset. Subtracting each column average from that column mean-centers the dataset (see equation 23).

$$P_e = \left(1 - \frac{1}{n}J\right)P_e^* \tag{23}$$

Here, I and J are the n×n identity matrix and matrix of ones respectively. With the Pe data matrix now defined, its principal components are determined. The PCA method uses a singular value decomposition ($P_e=U\Sigma W^T$) of the data matrix. The axes of highest variance are defined by the right singular vectors W. The orthonormal vectors of each column of W represent the unit vectors of the principal axis of Pe. The column, and therefore axis of highest variance, is that which corresponds to the largest singular value as defined by the diagonal elements of Σ. Thus, this primary singular vector $\vec{w}_1$ can provide a DOA.

The sum of the variances of the pulse powers along each principal axis can be shown to be proportional to the square of the singular values defined in Σ. In this way, the relative magnitudes of the singular values can be used as a metric for the degree of directionality of the received pulses. If signal strength is equal in all directions, the singular values will all be equal, and thus, no directional information can be obtained from the data. Conversely, if the first singular value is significantly larger than the second, the column of W associated with the first singular value will provide a good measure of the direction of the signal origin. The axis with maximum variance is defined as $\vec{w}_1$, with a singular value of $\sigma_1$ The second largest singular value $\sigma_2$ can be compared to the largest to provide a metric of certainty of the direction estimate provided by $\vec{w}_1$, using $$\tau = 1 - \frac{\sigma_2^2}{\sigma_1^2} \quad (23)$$

Thus, τ=0 when the data has equal variance along the first and second principal axes. Field testing has shown that as τ values fall to less than ~0.3, bearing errors begin to increase significantly.

To determine the proper direction (0° or 180°) along $\vec{w}_1$, the direction of average received pulse power is used when the antenna gain pattern is asymmetric. If the average pulse power vector is $$\vec{P}_{avg} = \frac{1}{n} P_e^T \vec{j} \quad (24)$$

where $\vec{j}$ is a n×1 vector of ones, then the sign of the primary singular vector can be corrected to point in the direction of the average signal power vector by multiplying it by the normalized dot product of the average power and primary singular vector, yielding $$\vec{w}_p = \frac{\vec{P}_{avg} \vec{w}_1}{\|\vec{P}_{avg}\| \|\vec{w}_1\|} \vec{w}_1 \quad (25)$$

The average power of the pulses $\vec{P}_{avg}$ provides a way to assess certainty as to the direction along the principal axis.

Figure 23B:
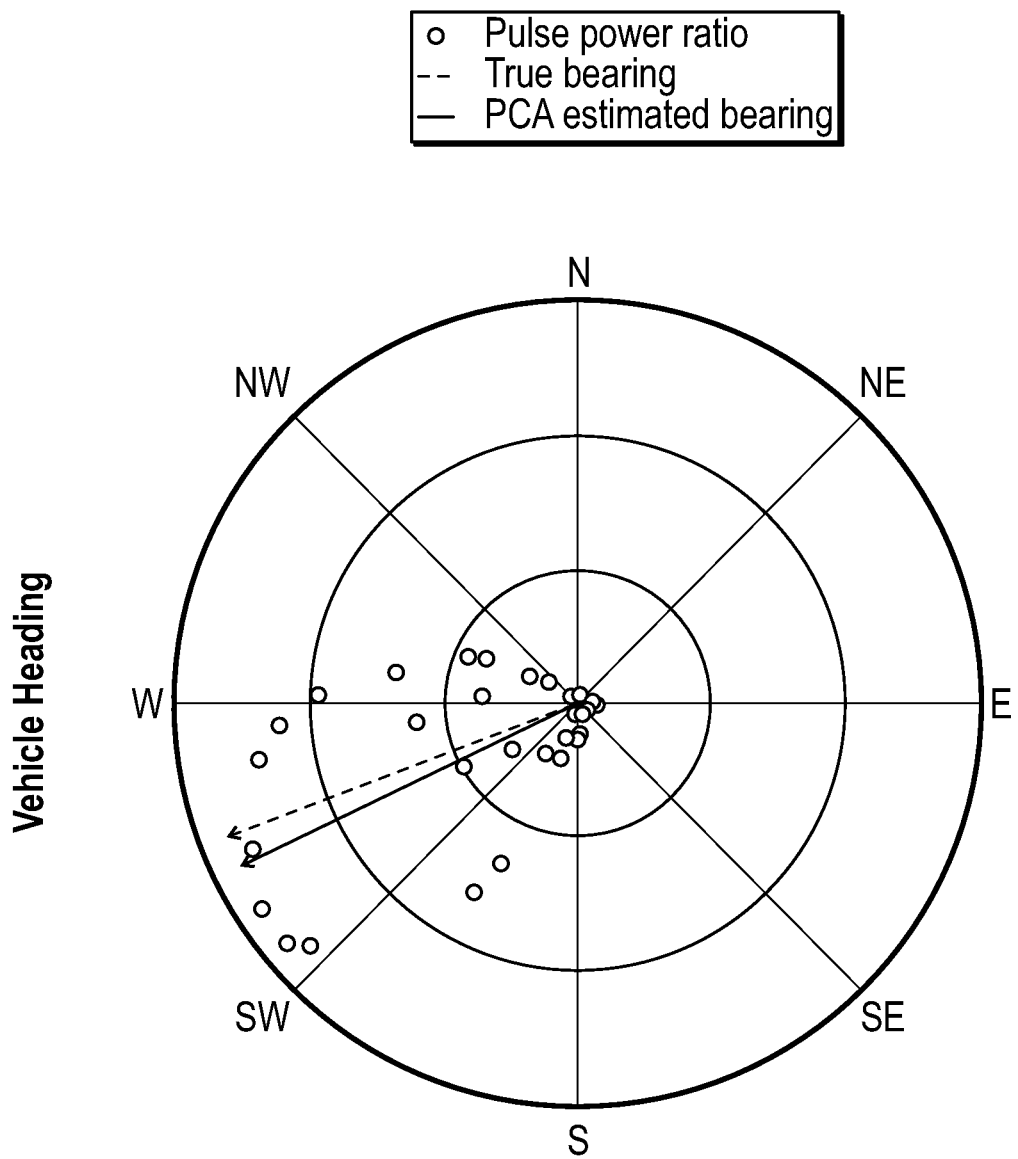
FIG. 23B is a polar plot of the data of FIG. 23A showing an estimated bearing from principal component analysis and a true bearing.

An example of the results of a PCA analysis plotted on a polar plot can be seen in the example of FIG. 23B where the PCA estimated bearing closely correlates with the true bearing.

Given a set of bearing vectors from the PCA analysis and the associated positions from which they were measured, methods of detecting the position of a radio tag this information to estimate the location of a tag. The outputs of the PCA bearing estimates can be used in any number of source location estimators in various implementations, such as, by non-limiting example, maximum likelihood estimator (MLE), repeated median regression (RMR), M-estimator technique. In some implementations, localization programs such as LOCATE, TRIANG and LOAS can be utilized to assess localization errors from the UAV bearing estimates. In particular implementations, an estimator that uses the recorded pulse amplitudes to weight each bearing to highlight how signal strength can be exploited for localization. The method is based on the idea of a center of mass (CM).

The CM method implementations first find the (x, y) intersection points of the bearing line emanating from each waypoint with that of all bearing lines. This creates $(n^2-n)/2$ intersection points, where n is the total number of waypoints. Each of these points is weighted; our weighting is based on the idea that waypoints with stronger signals should have more influence on the estimated position. The weighting $b_i$ is the product of the average pulse amplitudes from the two waypoints that generated the $i^{th}$ intersection. The method discards points whose parent lines were less than 30° apart, as localization errors from bearing errors become large when the bearing lines approach parallel. It has been observed that errors increase significantly for angles less than 20°, so discretion is needed to balance localization errors with the constraints of flight distance and range to the tag in various method implementations. Waypoints would thus ideally be separated by distances greater than 0.35× the expected range to the tag. The method also eliminates points that are based on bearings whose τ values are less than 0.35.

The resulting xi and yi intersections, and their corresponding weights (bi), can be used to find an estimated location using a weighted average similar to the CM of discrete particles.

$$\begin{bmatrix} X_{est} \\ Y_{est} \end{bmatrix} = \frac{1}{\sum_{i=1}^{m} b_i} \sum_{i=1}^{m} b_i \begin{bmatrix} x_i \\ y_i \end{bmatrix} \quad (26)$$

Figure 18:
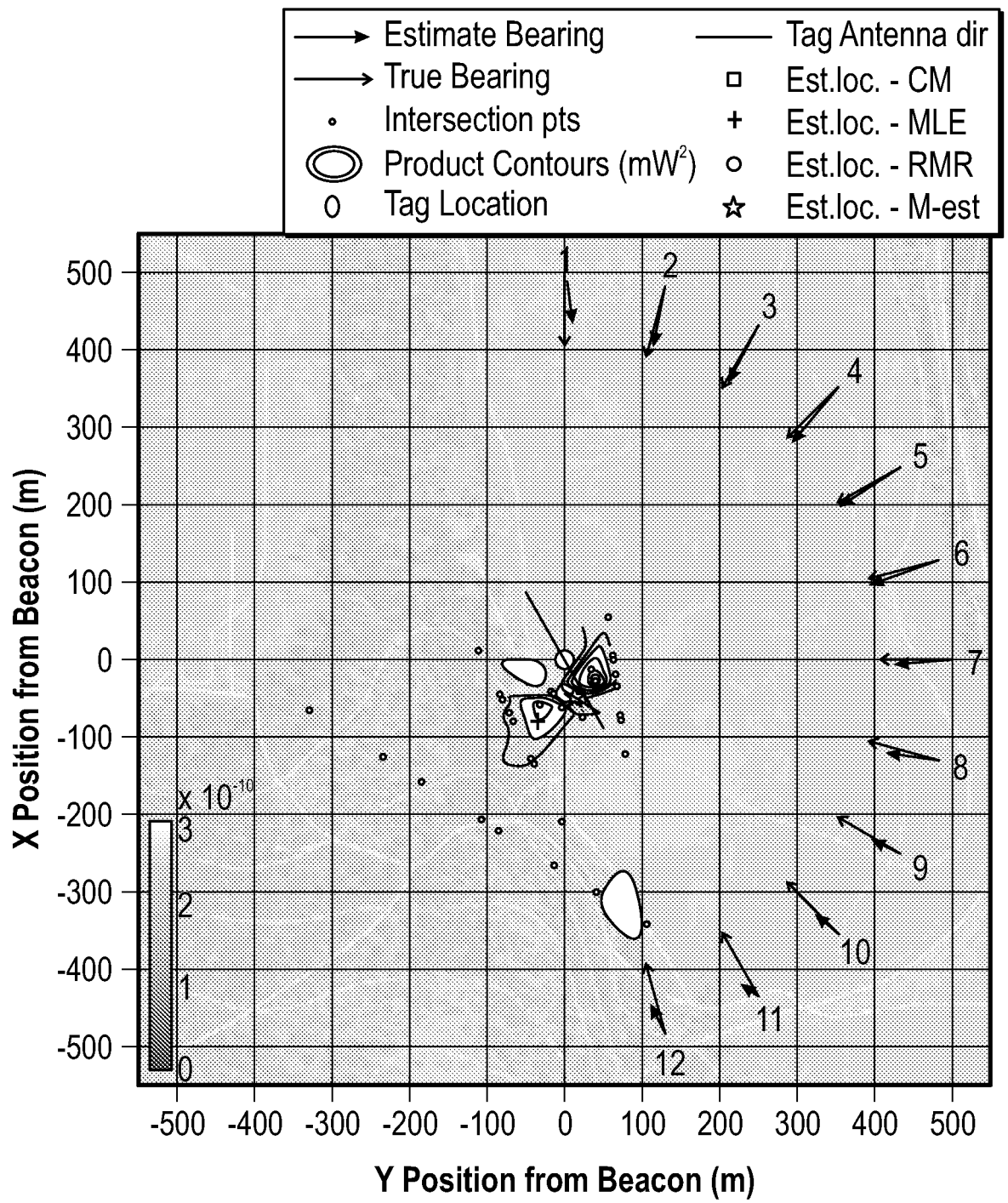
FIG. 18 is a diagram of a localization test and bearing results for a UAV test involving 12 waypoints.

Various field tests were performed using a UAV system implementation like that disclosed herein and employing implementations of the method of detecting a location of a radio tag like those disclosed herein. Referring to FIG. 18, the results of such a test where the radio tag was placed 1 m above ground and the UAV was flown at 122 m with 12 waypoints with a radius of 500 m from the tag with 6 spins conducted at each waypoint at a 25 degree/sec spin rate. The configuration was a DOA configuration. The results of the localization indicate that the predicted location of the radio tag was off by 45-87 m representing a 9-17% error.

Figure 19:
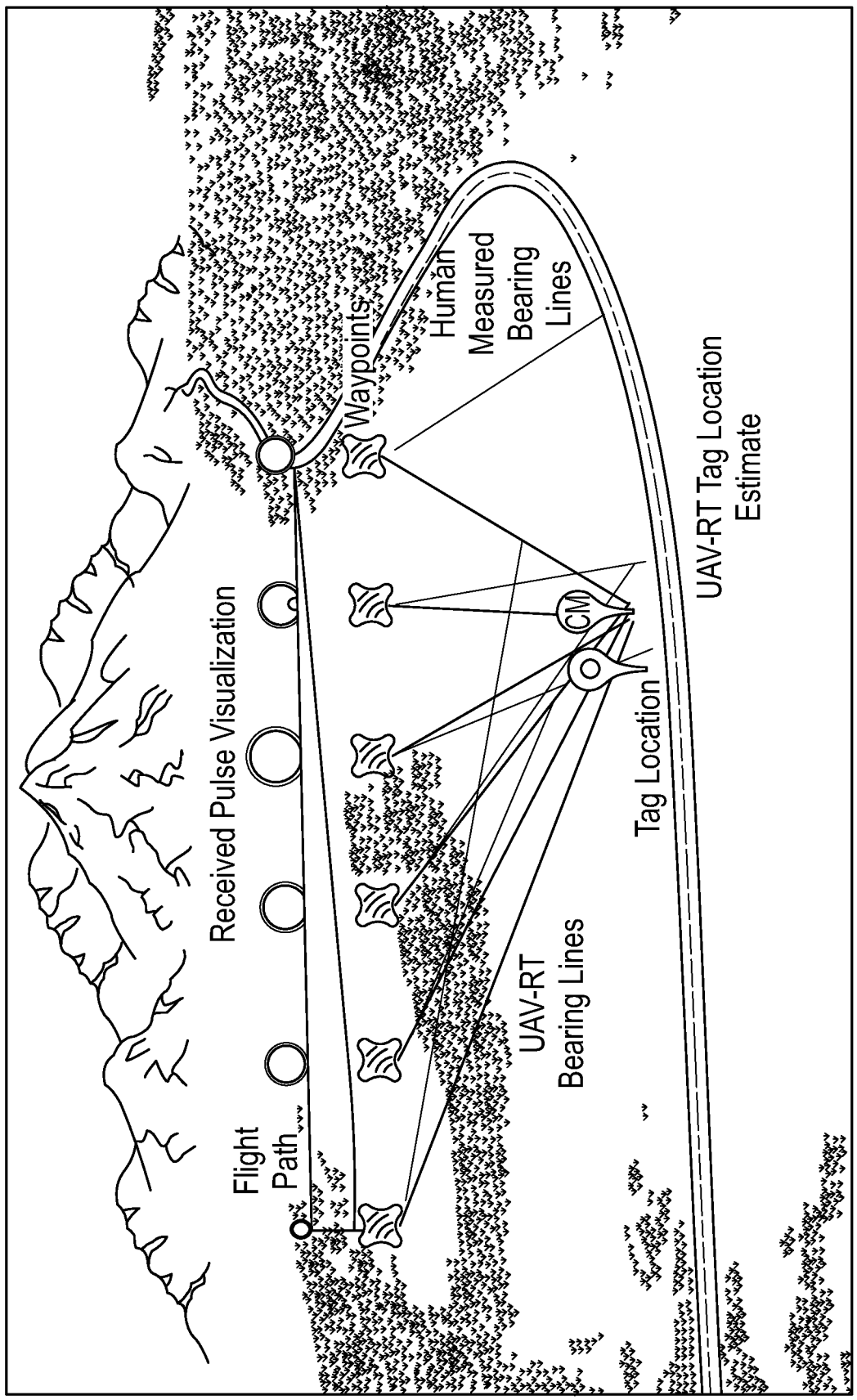
FIG. 19 is a diagram of another localization test utilizing a UAV with bearing results calculated by a system implementation like that disclosed herein compared to bearing results determined by a human operated system at multiple waypoints.

FIG. 19 demonstrates the results of a second comparative test between the performance of a human operator using a manual radio method compared to the use of the system and method implementations disclosed herein. A series of 6 waypoints were worked by both the human and UAV with the UAV flight path data pulse visualization represented by the size of the circles above each waypoint. On the diagram the thicker lines are the bearing lines calculated automatically by the base station signal processor using the radio data from the UAV during flight; the thinner lines are those measured by the human operator based on working each of the waypoints by ear. When averaged, the human bearing error was 5.1 with a position error of 26 m (4.9%) while the UAV system had a bearing error of 2.3 with a position error of 72 m (14%). This being said, it is apparent by inspect ion that the bearing lines from the UAV would more predictably allow a user to locate the radio tag no matter which waypoint was used while several of the human bearing lines drawn at a couple of the waypoints would simply not allow a user to reach the vicinity of the radio tag at all.

Figure 24A:
FIG. 24A is a diagram of a first portion of a software graphical user interface.
Figure 24B:
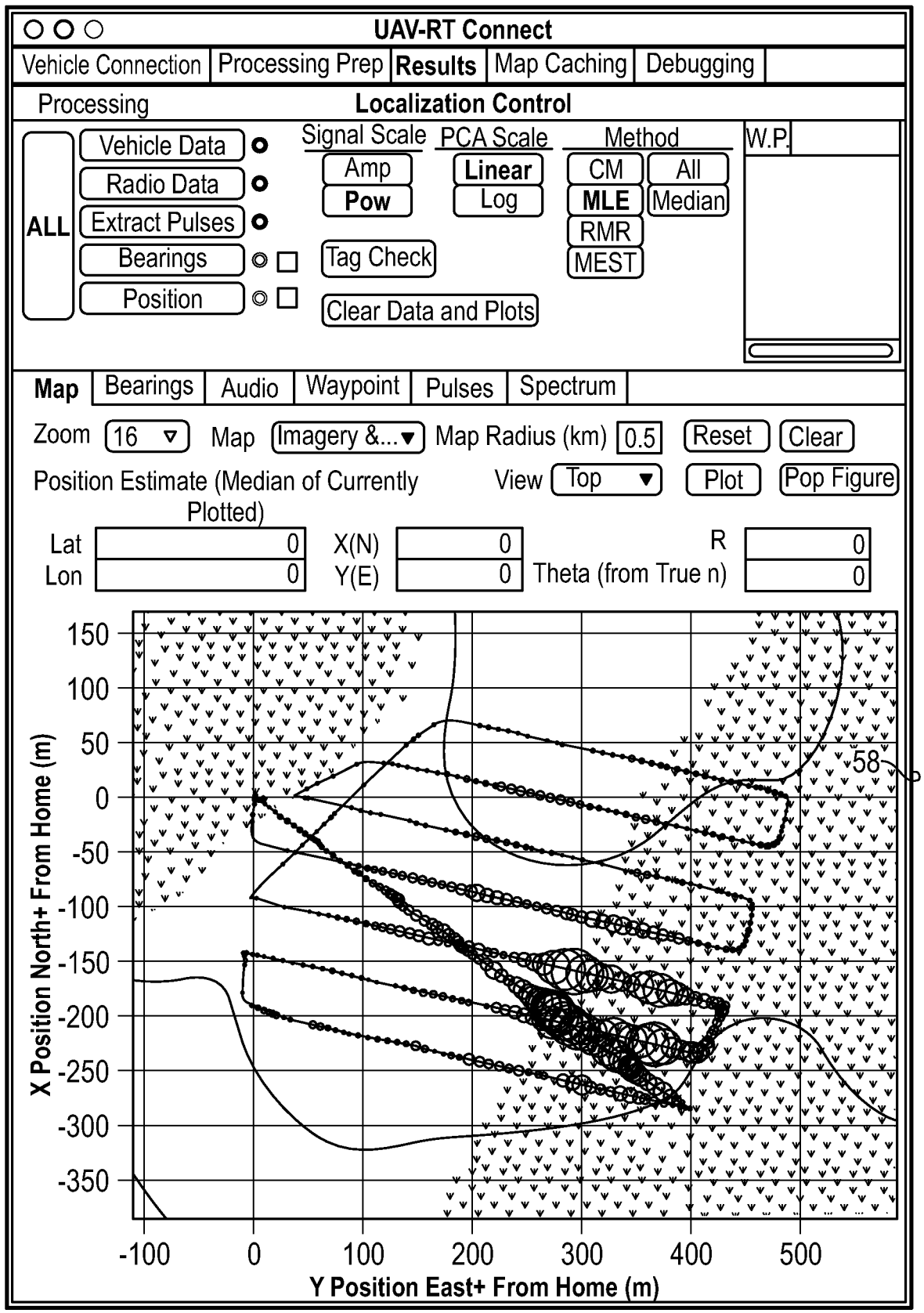
FIG. 24B is a diagram of a second portion of a software graphical user interface.

Various system implementations of base stations may utilized various graphical user interface designs used to assist the user with preparing and guiding the UAV and setting the various waypoints along with adjusting various parameters used in methods of detecting pulses, determining bearings, and locating a radio tag. An example implementation of such a graphical user interface is illustrated in FIGS. 24A-24B. In FIG. 24A, section 56 is used to aid in setting parameters associated with the various methods of detecting pulses disclosed herein. The graph 58 in FIG. 24B allows for ready visualization of the received pulse intensity/energy by geographic location during a UAV flight and shows the various waypoints/flight path of the UAV post flight. A wide variety of graphical user interfaces and method and system implementations may be constructed using the principles disclosed herein.

Where method and system implementations are utilized to process tags with different PRI, uncertainties, or pulse widths, complete reprocessing of the radio data set collected by the UAV during a flight may be required. However, processing radio tags that do not have differences in center frequencies, pulse frequencies, pulse widths, or other uncertainties may be challenging because the method implementations disclosed herein use found pulses to reduce the uncertainty for finding additional pulses to permit realtime processing to occur. In various method implementations, a way to handle this situation would be to identify the various tags while processing a first time interval (segment) but then focus on just one of the tags in each subsequent time interval during a first round of processing. The radio data can then be reprocessed to focus on a second radio tag so that bearings to the second tag can be generated as they were generated for the first radio tag. Some method implementations could utilize computer processing techniques to allow specific central processing unit (CPU) cores to be assigned to each radio tag detected in the radio data so that the processing could proceed simultaneously. However, in other implementations, it may be sufficient to simply reprocess the data serially focusing on one tag at a time to generate the bearing and location information desired.

While the various system and method implementations disclosed herein have been described using examples where the radio tags are adapted for use for wildlife tracking, the principles disclosed herein can be utilized for tracking any of a wide variety of other radio tags that involve other frequencies and pulse repetition rates. Other vehicles used other than UAVs for carrying the direction antenna utilized for receiving the radio signal from the various radio tags.

In places where the description above refers to particular implementations of radio tag detection systems and implementing components, sub-components, methods and sub-methods, it should be readily apparent that a number of modifications may be made without departing from the spirit thereof and that these implementations, implementing components, sub-components, methods and sub-methods may be applied to other radio tag detection systems.

What is claimed is:

1. A system for detecting a plurality of radio pulses, the system comprising:
   a directional antenna coupled with a software defined radio, the directional antenna and the software defined radio coupled to an unmanned aerial vehicle (UAV);
   a base station comprising a signal processor;
   wherein the signal processor is configured to receive radio data over a first time interval from the software defined radio received by the directional antenna and:
   combine at least three pulses comprised in the radio data;
   determine a detected time for each of the at least three pulses in the first time interval;
   using the detected time for each of the at least three pulses, predicting a future time for each of at least three future pulses; and
   using the software defined radio and directional antenna, listening for each of the at least three future pulses in radio data over a second time interval.

2. The system of claim 1, wherein combining the at least three pulses further comprises:
   filtering the radio data using a Chebyshev type II filter;
   windowing the radio data to form at least three pulse windows;
   performing a short-time Fourier transform of the radio data corresponding with each of the at least three pulse windows;
   summing magnitudes of Fourier coefficients of the short-time Fourier transforms of the radio data corresponding with each of the at least three pulse windows to form a plurality of short-time Fourier transform matrices;
   finding a maximum element for each of the short-time Fourier transform matrices; and
   applying a cumulative distribution function with a predetermined false alarm probability to each maximum element to confirm the detected time of each of the at least three pulses.

3. The system of claim 2, wherein the cumulative distribution function uses an Erlang distribution.

4. The system of claim 1, wherein the directional antenna is a VHF antenna.

5. The system of claim 1, wherein the radio data is generated by a wildlife tracking tag.

6. The system of claim 5, wherein the signal processor of the base station is further configured to identify a bearing of the wildlife tracking tag using a principal component analysis and the at least three pulses.

7. The system of claim 6, wherein the signal processor of the base station is further configured to use a plurality of bearings calculated from a plurality of waypoints reached by the UAV and a center of mass analysis to identify a physical location of the wildlife tracking tag.

8. A method of detecting a plurality of radio pulses, the method comprising: using a signal processor, combining at least three pulses comprised in radio data collected over a first time interval by a directional antenna coupled with a software defined radio coupled with an unmanned aerial vehicle (UAV), the UAV coupled with a base station comprising the signal processor; determining a detected time for each of the at least three pulses in the first time interval; using the detected time for each of the at least three pulses, predicting a future time for each of at least three future pulses; and using the software defined radio and directional antenna, listening for each of the at least three future pulses in radio data over a second time interval.

9. The method of claim 8, wherein combining the at least three pulses further comprises:
   filtering the radio data using a Chebyshev type II filter;
   windowing the radio data to form at least three pulse windows;
   performing a short-time Fourier transform of the radio data corresponding with each of the at least three pulse windows;
   summing magnitudes of Fourier coefficients of the short-time Fourier transforms of the radio data corresponding with each of the at least three pulse windows to form a plurality of short-time Fourier transform matrices;

finding a maximum element for each of the short-time Fourier transform matrices; and applying a cumulative distribution function with a predetermined false alarm probability to each maximum element to confirm the detected time of each of the at least three pulses.

10. The method of claim 9, wherein the cumulative distribution function uses an Erlang distribution.

11. The method of claim 8, wherein the directional antenna is a VHF antenna.

12. The method of claim 8, wherein the radio data is generated by a wildlife tracking tag.

13. The method of claim 12, further comprising, using the signal processor of the base station, identifying a bearing of the wildlife tracking tag using a principal component analysis and the at least three pulses.

14. The method of claim 13, further comprising, using the signal processor and a plurality of bearings calculated from a plurality of waypoints reached by the UAV and a center of mass analysis, identifying a physical location of the wildlife tracking tag.

15. A method of detecting a location of a radio tag, the method comprising:

launching an unmanned aerial vehicle (UAV);

reaching two or more waypoints with the UAV and performing one or more yaw rotations over a time interval at each of the two or more waypoints;

using a signal processor, combining at least three pulses comprised in radio data collected over each time interval at each of the two or more waypoints from a radio tag by a directional antenna coupled with a software defined radio coupled with the UAV, the UAV coupled with a base station comprising the signal processor;

using the signal processor, determining a detected time for each of the at least three pulses in each time interval for each of the two or more waypoints;

using the signal processor, identifying two or more bearings of the radio tag using a principal component analysis and the detected times; and using the signal processor, the two or more bearings, and a center of mass analysis, identifying a physical location of the radio tag.

16. The method of claim 15, wherein the radio tag is a first radio tag and further comprising a second radio tag with a different pulse repetition interval from a pulse repetition interval of the first radio tag.

17. The method of claim 16, further comprising repeating combining the at least three pulses comprised in the radio data collected over each time interval, determining a detected time, identifying two or more bearings, and identifying a physical location for the second radio tag.

18. The method of claim 17, wherein the two or more waypoints are arranged in linear passes across a testing area.

19. The method of claim 15, wherein combining the at least three pulses comprised in the radio data collected over each time interval at each of the two or more waypoints from the radio tag further comprises:

windowing the radio data to form at least three pulse windows;

performing a short-time Fourier transform of the radio data corresponding with each of the at least three pulse windows;

summing magnitudes of Fourier coefficients of the short-time Fourier transforms of the radio data corresponding with each of the at least three pulse windows to form a plurality of short-time Fourier transform matrices;

finding a maximum element for each of the short-time Fourier transform matrices; and applying a cumulative distribution function with a predetermined false alarm probability to each maximum element to confirm the detected time of each of the at least three pulses.

20. The method of claim 15, wherein the radio tag is a wildlife tracking tag.

* * * * *

UNITED STATES PATENT AND TRADEMARK OFFICE
CERTIFICATE OF CORRECTION

PATENT NO. : 11,588,226 B1
APPLICATION NO. : 17/448511
DATED : February 21, 2023
INVENTOR(S) : Michael W. Shafer and Paul G. Flikkema It is certified that error appears in the above-identified patent and that said Letters Patent is hereby corrected as shown below:

In the Specification

Column 9, Line 25, the equation (8) "$w_{fc}^H = w_{fc}^H F p = w_{fc}^H 1_{fc}$" should read "$w_{fc}^H p = w_{fc}^H F p = w_{fc}^H 1_{fc}$".

Signed and Sealed this
Eighteenth Day of July, 2023

Katherine Kelly Vidal
*Director of the United States Patent and Trademark Office*